(12) United States Patent
Kasmir et al.

(10) Patent No.: US 9,179,109 B1
(45) Date of Patent: Nov. 3, 2015

(54) DOORBELL COMMUNICATION SYSTEMS AND METHODS

(71) Applicant: SkyBell Technologies, Inc., Irvine, CA (US)

(72) Inventors: Seton Paul Kasmir, San Diego, CA (US); Joseph Frank Scalisi, Yorba Linda, CA (US)

(73) Assignee: SkyBell Technologies, Inc., Irvine, CA (US)

( * ) Notice: Subject to any disclaimer, the term of this patent is extended or adjusted under 35 U.S.C. 154(b) by 0 days.

(21) Appl. No.: 14/726,517

(22) Filed: May 30, 2015

Related U.S. Application Data

(63) Continuation-in-part of application No. 14/612,376, filed on Feb. 3, 2015, now Pat. No. 9,058,738, and a continuation-in-part of application No. 14/589,830, filed on Jan. 5, 2015, now Pat. No. 9,060,104.

(60) Provisional application No. 62/158,750, filed on May 8, 2015.

(51) Int. Cl.
H04N 9/47 (2006.01)
H04N 7/18 (2006.01)
H04M 11/02 (2006.01)
H04N 5/77 (2006.01)
H04N 5/232 (2006.01)
(Continued)

(52) U.S. Cl.
CPC ............ *H04N 7/186* (2013.01); *H04M 11/025* (2013.01); *H04N 5/23241* (2013.01); *H04N 5/77* (2013.01); *H04N 7/185* (2013.01); *H04N 7/188* (2013.01); *G06F 1/3287* (2013.01); *H04L 2012/2849* (2013.01)

(58) Field of Classification Search
CPC .. G06F 1/3287; H04N 5/23245; H04N 7/188; H04N 7/185; H04N 7/18; H04N 7/186; B60R 25/305; H04L 2012/2849
USPC .......................................................... 348/143
See application file for complete search history.

(56) References Cited

U.S. PATENT DOCUMENTS

| 3,708,742 A | 1/1973 | Gunn |
| 4,523,193 A | 6/1985 | Levinson |
| D283,130 S | 3/1986 | Boenning |

(Continued)

FOREIGN PATENT DOCUMENTS

| CN | 1902609 | 5/2010 |
| CN | 202872976 | 4/2013 |

(Continued)

OTHER PUBLICATIONS

Doorbot—Downloaded on Nov. 18, 2013 from http://www.craigncompany.com/home-tech-doorbot/; prior art publication at least as of Jun. 10, 2013.

(Continued)

*Primary Examiner* — Andy Rao
*Assistant Examiner* — Jared Walker

(57) ABSTRACT

A doorbell system can include a remote computing device and a doorbell that has a camera. The doorbell can enter a camera sleep mode wherein the camera is configured not to record. The remote computing device can be used to override a power setting of the doorbell to enable the doorbell to record a video. Then, the remote computing device can receive the video that was recorded by the doorbell.

30 Claims, 14 Drawing Sheets

(51) Int. Cl.
     *H04L 12/28*     (2006.01)
     *G06F 1/32*      (2006.01)

(56)             References Cited

U.S. PATENT DOCUMENTS

| | | |
|---|---|---|
| D297,222 S | 8/1988 | Rauch |
| 4,843,461 A | 6/1989 | Tatsumi |
| 5,210,520 A | 5/1993 | Housley |
| 5,428,388 A | 6/1995 | Von Bauer |
| 5,493,618 A | 2/1996 | Stevens |
| 5,521,578 A | 5/1996 | DelValle |
| D371,086 S | 6/1996 | Collins |
| D381,638 S | 7/1997 | Kruse |
| 5,784,446 A | 7/1998 | Stuart |
| D404,673 S | 1/1999 | Gordon |
| 5,907,352 A | 5/1999 | Gilley |
| 5,995,139 A | 11/1999 | Lee |
| 6,028,626 A | 2/2000 | Aviv |
| D421,727 S | 3/2000 | Pierson |
| D422,521 S | 4/2000 | Morrow |
| 6,073,192 A | 6/2000 | Clapp |
| 6,094,213 A | 7/2000 | Mun |
| 6,185,294 B1 | 2/2001 | Chornenky |
| 6,226,031 B1 | 5/2001 | Barraclough |
| 6,429,893 B1 | 8/2002 | Xin |
| 6,590,604 B1 | 7/2003 | Tucker |
| 6,661,340 B1 | 12/2003 | Saylor |
| 6,727,811 B1 | 4/2004 | Fendis |
| 6,753,899 B2 | 6/2004 | Lapalme |
| 6,778,084 B2 | 8/2004 | Chang |
| D500,751 S | 1/2005 | Yukikado |
| D501,652 S | 2/2005 | Pierson |
| 7,015,943 B2 | 3/2006 | Chiang |
| D519,100 S | 4/2006 | Shioya |
| D522,490 S | 6/2006 | Yukikado |
| D525,963 S | 8/2006 | Yukikado |
| 7,113,578 B2 | 9/2006 | Unger |
| D531,160 S | 10/2006 | Yukikado |
| 7,193,644 B2 | 3/2007 | Carter |
| D562,306 S | 2/2008 | Jeong |
| 7,330,649 B2 | 2/2008 | Finizio |
| 7,375,492 B2 | 5/2008 | Calhoon |
| D577,301 S | 9/2008 | Johnson |
| 7,429,924 B2 | 9/2008 | Langer |
| 7,477,134 B2 | 1/2009 | Langer |
| 7,492,303 B1 | 2/2009 | Levitan |
| D588,574 S | 3/2009 | Takahata |
| D595,260 S | 6/2009 | Takahata |
| 7,583,191 B2 | 9/2009 | Zinser |
| 7,701,171 B2 | 4/2010 | Defant |
| 7,738,917 B2 | 6/2010 | Ryley |
| 7,746,223 B2 | 6/2010 | Howarter |
| 7,752,070 B2 | 7/2010 | Hatcher |
| 7,956,576 B2 | 6/2011 | Neu |
| 8,016,676 B2 | 9/2011 | Carter |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| D660,819 S | 5/2012 | Chen |
| 8,193,919 B2 | 6/2012 | Langer |
| 8,354,914 B2 | 1/2013 | Buckingham |
| 8,504,103 B2 | 8/2013 | Ficquette |
| D689,828 S | 9/2013 | Pierson |
| 8,562,158 B2 | 10/2013 | Chien |
| 8,565,399 B2 | 10/2013 | Siminoff |
| D692,847 S | 11/2013 | Barley |
| 8,669,876 B2 | 3/2014 | Anderson |
| D707,147 S | 6/2014 | Crippa |
| 8,780,201 B1 | 7/2014 | Scalisi et al. |
| D710,727 S | 8/2014 | Siminoff |
| D710,728 S | 8/2014 | Siminoff |
| D711,275 S | 8/2014 | Scalisi |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,055,202 B1 | 6/2015 | Scalisi et al. |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 2003/0025599 A1 | 2/2003 | Monroe |
| 2004/0085205 A1 | 5/2004 | Yeh |
| 2004/0085449 A1 | 5/2004 | Millet |
| 2004/0086093 A1 | 5/2004 | Schranz |
| 2004/0178889 A1 | 9/2004 | Buckingham |
| 2004/0229569 A1 | 11/2004 | Franz |
| 2004/0257336 A1 | 12/2004 | Hershkovitz |
| 2005/0007451 A1 | 1/2005 | Chiang |
| 2005/0071879 A1 | 3/2005 | Haldavnekar |
| 2005/0097248 A1 | 5/2005 | Kelley |
| 2005/0285934 A1 | 12/2005 | Carter |
| 2005/0285944 A1 | 12/2005 | Watanabe |
| 2006/0010504 A1 | 1/2006 | Sharma |
| 2006/0038663 A1 | 2/2006 | Steinetz |
| 2006/0093187 A1 | 5/2006 | Mittal |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1 | 7/2006 | Wang |
| 2006/0271678 A1 | 11/2006 | Jessup |
| 2007/0046442 A1 | 3/2007 | Bartorelli |
| 2007/0126574 A1 | 6/2007 | Langer |
| 2007/0146115 A1 | 6/2007 | Roosli |
| 2007/0194945 A1 | 8/2007 | Atkinson |
| 2008/0036862 A1 | 2/2008 | Lang |
| 2008/0128586 A1 | 6/2008 | Johnson |
| 2008/0167072 A1 | 7/2008 | Berstis |
| 2008/0198225 A1 | 8/2008 | Gal |
| 2008/0297339 A1 | 12/2008 | Mathews |
| 2009/0059002 A1 | 3/2009 | Kim |
| 2009/0072963 A1 | 3/2009 | Langer |
| 2009/0093235 A1 | 4/2009 | Grealish |
| 2009/0141939 A1 | 6/2009 | Chambers |
| 2009/0284578 A1 | 11/2009 | Carter |
| 2009/0296641 A1 | 12/2009 | Bienas |
| 2010/0087161 A1 | 4/2010 | Young |
| 2010/0103300 A1 | 4/2010 | Jones |
| 2010/0134072 A1 | 6/2010 | Neu |
| 2010/0195810 A1 | 8/2010 | Mota |
| 2010/0245060 A1 | 9/2010 | Tylicki |
| 2010/0276570 A1 | 11/2010 | Moser |
| 2011/0121940 A1 | 5/2011 | Jones |
| 2011/0207509 A1 | 8/2011 | Crawford |
| 2011/0287718 A1 | 11/2011 | Abel |
| 2012/0027248 A1 | 2/2012 | Feris |
| 2012/0044049 A1 | 2/2012 | Vig |
| 2012/0044050 A1 | 2/2012 | Vig |
| 2012/0098439 A1 | 4/2012 | Recker |
| 2012/0108215 A1 | 5/2012 | Kameli |
| 2012/0113253 A1 | 5/2012 | Slater |
| 2012/0162416 A1 | 6/2012 | Su |
| 2012/0229282 A1 | 9/2012 | Zagami |
| 2012/0230203 A1 | 9/2012 | Casey |
| 2012/0262581 A1 | 10/2012 | Carter |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0287123 A1 | 11/2012 | Starner |
| 2012/0327246 A1 | 12/2012 | Senior |
| 2013/0020875 A1 | 1/2013 | Wozniak |
| 2013/0045763 A1 | 2/2013 | Ruiz |
| 2013/0057695 A1 | 3/2013 | Huisking |
| 2013/0094444 A1 | 4/2013 | Lai |
| 2013/0128050 A1 | 5/2013 | Aghdasi |
| 2013/0130749 A1 | 5/2013 | Andersen |

(56) References Cited

U.S. PATENT DOCUMENTS

| | | | |
|---|---|---|---|
| 2013/0136033 A1 | 5/2013 | Patil |
| 2013/0147964 A1 | 6/2013 | Frank |
| 2013/0169809 A1 | 7/2013 | Grignan |
| 2013/0169814 A1 | 7/2013 | Liu |
| 2013/0173477 A1 | 7/2013 | Cairns |
| 2013/0208123 A1 | 8/2013 | Lakhani |
| 2013/0223279 A1 | 8/2013 | Tinnakornsrisuphap |
| 2013/0293722 A1 | 11/2013 | Chen |
| 2014/0015967 A1 | 1/2014 | Moore |
| 2014/0088761 A1 | 3/2014 | Shamlian |
| 2014/0125754 A1 | 5/2014 | Haywood |
| 2014/0149706 A1 | 5/2014 | Shim |
| 2014/0167676 A1 | 6/2014 | Mack |
| 2014/0253725 A1 | 9/2014 | Hsu |
| 2015/0022618 A1 | 1/2015 | Siminoff |
| 2015/0022620 A1 | 1/2015 | Siminoff |
| 2015/0029335 A1 | 1/2015 | Kasmir et al. |
| 2015/0049191 A1 | 2/2015 | Scalisi et al. |
| 2015/0054949 A1 | 2/2015 | Scalisi |
| 2015/0061859 A1 | 3/2015 | Matsuoka |
| 2015/0063559 A1 | 3/2015 | Siminoff |
| 2015/0070495 A1 | 3/2015 | Scalisi |
| 2015/0092055 A1 | 4/2015 | Scalisi et al. |
| 2015/0112885 A1 | 4/2015 | Fadell |
| 2015/0194839 A1 | 7/2015 | Wojcik |

FOREIGN PATENT DOCUMENTS

| | | |
|---|---|---|
| CN | 202939738 | 5/2013 |
| EP | 684743 | 7/1999 |
| GB | 2400958 | 10/2004 |
| WO | 01/93220 | 12/2001 |
| WO | WO2007111802 | 10/2007 |

OTHER PUBLICATIONS

Doorbot—Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.

Doorbot—Downloaded on Nov. 18, 2013 from http://www.digitaltrends.com/lifestyle/doorbot-camera-see-visitors-smartphone/; prior art publication at least as of Dec. 9, 2012.

Doorbot website—Downloaded on Nov. 18, 2013 from http://www.getdoorbot.com/.

Doorbot users manual—Downloaded on Nov. 18, 2013 from http://static.mydoorbot.com/DoorBot%20Users%20Manual%201.0.pdf.

Doorbot "fact sheet"—Downloaded on Nov. 18, 2013 from http://cdn.shopify.com/s/files/1/0247/6501/files/DoorBotMediaKit.pdf?17037.

Doorbot "features kit"—Downloaded on Nov. 18, 2013 from http://cdn.shopify.com/s/files/1/0247/6501/files/DoorBot_Features_Kit.pdf?17037.

CellNock index page—Originally downloaded on Sep. 23, 2013 from http://cellnock.com/index.html; The website says CellNock is "patent pending".

CellNock about founder page—downloaded on Nov. 18, 2013 from http://cellnock.com/index.html; The website says CellNock is "patent pending".

CellNock learn more page—Downloaded on Nov. 18, 2013 from http://cellnock.com/learn_more.htm; The website says CellNock is "patent pending".

CellNock product page—Downloaded on Nov. 18, 2013 from http://cellnock.com/products.htm; The website says CellNock is "patent pending".

Philips InSight Baby Monitor—Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.

MySkyBell.com—Part 1 (previously iDoorCam.com)—Downloaded on Nov. 18, 2013 from http://www.myskybell.com/.

MySkyBell.com—Part 2 (previously iDoorCam.com)—Downloaded on Nov. 18, 2013 from http://www.myskybell.com/.

MySkyBell.com—Part 3 (previously iDoorCam.com)—Downloaded on Nov. 18, 2013 from http://www.myskybell.com/.

MySkyBell.com—Part 4 (previously iDoorCam.com)—Downloaded on Nov. 18, 2013 from http://www.myskybell.com/.

MySkyBell.com—Part 5 (previously iDoorCam.com)—Downloaded on Nov. 18, 2013 from http://www.myskybell.com/.

Squaritz IDS Doorbell System—Downloaded on Aug. 15, 2013 from http://www.indiegogo.com/projects/squaritz-ids-intelligent-doorbell-system.

MyBells—Downloaded on Nov. 18, 2013 from http://www.indiegogo.com/projects/mybells-the-smart-bells.

Wireless video doorbell pager—Downloaded on Aug. 9, 2013 from http://www.indiegogo.com/projects/wireless-video-doorbell-pager--4.

Lockitron—Downloaded on Jul. 24, 2013 from https://lockitron.com/preorder.

EyeTalk for home—Downloaded on May 24, 2013 from http://www.revolutionaryconceptsinc.com/forhome.html.

EyeTalk Product—Downloaded on Nov. 18, 2013 from http://www.revolutionaryconceptsinc.com/eyetalk.html.

Langer Doorbell Light—Downloaded on Nov. 18, 2013 from http://www.youtube.com/watch?v=u9nNCm4tSYI; published at least as early as Apr. 2013.

SmartBell—Downloaded on Dec. 5, 2013 from http://smartbell.co/This_is_smartbell.html.

SmartBell—Downloaded on Dec. 5, 2013 from http://smartbell.co/Tech_specs.html.

SmartBell—Downloaded on Dec. 5, 2013 from http://smartbell.co/FAQ.html.

SmartBell—A Doorbell for Smartphones, published by Scrambled Brains Tech, LLC., Oct. 1, 2013.

August Smart Lock—Part 1—Downloaded on Jun. 10, 2014 from www.August.com.

August Smart Lock—Part 2—Downloaded on Jun. 10, 2014 from www.August.com.

August Smart Lock—Part 3—Downloaded on Oct. 10, 2014 from www.August.com.

Kevo Lock—User guide—Downloaded on Jun. 10, 2014 from http://s7d5.scene7.com/is/content/BDHHI/Kwikset/Website%20Content/Kevo/kevo-userguide-kwikset_eng.pdf.

Kevo Lock—Installation guide—Downloaded on Oct. 10, 2014 from http://s7d5.scene7.com/is/content/BDHHI/Kwikset/Website%20Content/Kevo/installation_guide.pdf.

Schlage Electronic Lock—User guide—Downloaded on Jun. 10, 2014 from www.schlage.com.

Lock-Style Solenoid—Downloaded on Aug. 22, 2014 from www.AdaFruit.com.

Power Matters Alliance—Downloaded on Aug. 23, 2014 from www.wikipedia.com.

Push-Pull Solenoid—Downloaded on Aug. 22, 2014 from www.AdaFruit.com.

Push-Pull Solenoid—Technical Details—Downloaded on Aug. 22, 2014 from www.AdaFruit.com.

Qi—Downloaded on Aug. 23, 2014 from www.wikipedia.com.

TP-Link—Website—Downloaded on Jul. 15, 2014 from www.tp-link.us.

TP-Link—User guide—Downloaded on Jul. 15, 2014 from www.tp-link.us.

AC Adapter Spy Camera—Downloaded on Jun. 24, 2014 from ahdcameras.com.

FanFare Chime—Downloaded on Oct. 10, 2014 from https://www.kickstarter.com/projects/1040187373/1919517395?token=47099d90.

Ring Video Doorbell—Downloaded on Oct. 10, 2014 from www.ring.com.

Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.

iChime Customizable Digital Chime System—Downloaded on Nov. 7, 2014 from http://www.ichime.com/.

(56) References Cited

OTHER PUBLICATIONS

Philips InSight Wireless HD Baby Monitor—Downloaded on Jul. 24, 2013 from http://www.amazon.com/Philips-InSight-Wireless-Baby-Monitor/dp/B00AALO9Z6/ref=sr_1_2?ie=UTF8&qid=1374704204&sr=8-2&keywords=philips+insight+wi-fi+baby+monitor.
CellNock—Downloaded on Sep. 23, 2013 from http://cellnock.com/products.htm.
CellNock Index—Downloaded on Sep. 23, 2013 from http://cellnock.com/index.html.
DoorBot—Downloaded on Jun. 14, 2013 from https://christiestreet.com/products/doorbot.
iDoorCam—A Wi-Fi Enabled, Webcam Doorbell—Downloaded on Sep. 3, 2013 from http://www.idoorcam.com/.
Squaritz IDS—Intelligent Doorbell System—Downloaded on Aug. 15, 2013 from http://www.indiegogo.com/projects/squaritz-ids-intelligent-doorbell-system.
Eyetalk for Home—Downloaded May 24, 2013 from http://www.revolutionaryconceptsinc.com/forhome.html.
DoorBot—Downloaded on Jul. 26, 2013 from http://www.getdoorbot.com.
Langer Doorbell Button Sized Light—Downloaded on Sep. 16, 2013 from http://www.youtube.com/watch?v=u9nNCm4tSYI.
Langer Doorbell Light—Downloaded on Sep. 16, 2013 from http://www.youtube.com/watch?v=6dbU-Gyjgx8.
SmartBell on Kickstarter—Downloaded on Feb. 28, 2014 from http://www.kickstarter.com/projects/1256599792/ smartbell-wi-fi-doorbell-for-video-chats-to-ios-an.
DefenDoor by Glate LLC—Downloaded on Dec. 11, 2014 from https://www.kickstarter.com/projects/85455040/ defendoor-a-home-security-system-that-syncs-with-y.
Notifi by Chamberlain—Downloaded on Jan. 9, 2015 from http://www.cnet.com/products/chamberlain-notifi-video-door-chime/.
i-Bell—Downloaded on Jan. 13, 2015 from https://www.kickstarter.com/projects/729057054/i-bell.
Dropcam—Downloaded on Jan. 19, 2015 from https://www.dropcam.com/dropcam-pro.
DoorBird—Downloaded on Jan. 23, 2015 from http://www.doorbird.com/.
Chui Doorbell—Downloaded on Jan. 23, 2015 from http://www.getchui.com/.
Chui Doorbell—Downloaded on Jan. 23, 2015 from http://techcrunch.com/2014/04/18/214-technologies-is-crowdfunding-a-smart-doorbell-called-chui/.
GoPano—Downloaded on Jan. 23, 2015 from http://www.gizmag.com/gopano-micro-captures-360-degree-video-on-iphone/18542/.
Sengled Snap Light Camera—Downloaded on Mar. 9, 2015 from http://www.sengled.com/product/snap.
Alarm.com Garage Door Camera—Downloaded on Mar. 9, 2015 from http://www.cnet.com/au/products/alarm-com-for-apple-watch/.
Rollup iHome peephole doorbell—Downloaded on May 7, 2015 from http://www.rollupcn.com.
Ring Chime—Smart Chime—Downloaded on May 13, 2015 from http://techcrunch.com/2015/05/13/rings-smart-doorbell-gets-a-smart-speaker/#.y0xlqx:SpqY.
Peeple—Peephole Camera—Downloaded on May 14, 2015 from https://www.kickstarter.com/projects/1544392549/peeple-caller-id-for-your-front-door/video_share.
Vivant Doorbell Camera—Downloaded on May 20, 2015 from http://www.vivint.com/company/newsroom/press/Vivint-Introduces-Wi-Fi-Enabled-Doorbell-Camera-into-Its-Smart-Home-Platform.
MyInterCom video system—Downloaded on Jun. 8, 2015 from http://myintercom.de/en/funktionsweise.

DOORBELL COMMUNICATION SYSTEMS AND METHODS

CROSS-REFERENCE TO RELATED APPLICATIONS

The entire contents of the following application are incorporated by reference herein: U.S. Provisional Patent Application No. 62/158,750; filed May 8, 2015; and entitled DOORBELL COMMUNICATION SYSTEMS AND METHODS.

The entire contents of the following applications are incorporated by reference herein: U.S. Nonprovisional patent application Ser. No. 14/612,376; filed Feb. 3, 2015; and entitled DOORBELL COMMUNICATION SYSTEMS AND METHODS; U.S. Nonprovisional patent application Ser. No. 14/502,601; filed Sep. 30, 2014; and entitled DOORBELL COMMUNICATION SYSTEMS AND METHODS; U.S. Nonprovisional patent application Ser. No. 14/492,809; filed Sep. 22, 2014; and entitled DOORBELL COMMUNICATION SYSTEMS AND METHODS; U.S. Nonprovisional patent application Ser. No. 14/275,811; filed May 12, 2014; and entitled DOORBELL COMMUNICATION SYSTEMS AND METHODS; U.S. Nonprovisional patent application Ser. No. 14/142,839; filed Dec. 28, 2013; and entitled DOORBELL COMMUNICATION SYSTEMS AND METHODS; U.S. Nonprovisional patent application Ser. No. 14/099,888; filed Dec. 6, 2013; and entitled DOORBELL COMMUNICATION SYSTEMS AND METHODS; and U.S. Nonprovisional patent application Ser. No. 14/098,772; filed Dec. 6, 2013; and entitled DOORBELL COMMUNICATION SYSTEMS AND METHODS.

The entire contents of the following application are incorporated by reference herein: International Application No. PCT/US14/47622; filed Jul. 22, 2014 with the U.S. Patent and Trademark Office; and entitled DOORBELL COMMUNICATION SYSTEMS AND METHODS.

The entire contents of the following application are incorporated by reference herein: International Application No. PCT/US14/53506; filed Aug. 29, 2014 with the U.S. Patent and Trademark Office; and entitled DOORBELL COMMUNICATION SYSTEMS AND METHODS.

BACKGROUND

1. Field

Various embodiments disclosed herein relate to doorbells. Certain embodiments relate to doorbell communication systems.

2. Description of Related Art

Doorbells can enable a person located outside of an entry point, such as a door, to alert a person inside of an entry point that someone outside would like to talk to someone inside. Doorbells sometimes include a button located near a door, such as a front door, side door, or back door of a home, office, dwelling, warehouse, building, or structure. Doorbells are sometimes used near a gate or some other entrance to a partially enclosed area. Pushing the doorbell sometimes causes a chime or other alerting sound to be emitted.

SUMMARY

Videos recorded by doorbells can be displayed on remote computing devices. Thus, a user of a remote computing device can see and hear a visitor that is located near a doorbell. In some embodiments, the doorbell can send a notification to the remote computing device when the doorbell detects a visitor. The user can then start two-way audio and/or video communication with the visitor.

In some embodiments, a user of a remote computing device might want to start a live video and/or review old videos from the doorbell without waiting for a notification from the doorbell. For example, a user might want to see the weather outside of her home or might want to see if there is a package on her porch. Thus, the user can start a live video even when no visitor is present.

In several embodiments, methods may include using a doorbell system. The doorbell system can comprise a remote computing device and a doorbell. The doorbell can have a camera. The method may include entering a camera sleep mode wherein, the camera is configured to not record, opening a doorbell control application on the remote computing device; overriding, by the remote computing device via a wireless communication, a power setting of the doorbell to force the doorbell to exit the camera sleep mode and enter a camera recording mode, wherein the camera recording mode consumes more power than the camera sleep mode; and receiving a first video, by the remote computing device, from the doorbell at least partially in response to remotely overriding the power setting of the doorbell.

Some embodiments may include one or more of the following features. For example, methods may further comprise displaying the first video on the remote computing device during the camera recording mode, wherein the doorbell enters the camera recording mode without detecting a visitor and without detecting a press of a button of the doorbell. After the overriding, methods may include sending, at least partially by the remote computing device, a signal to the doorbell that causes the doorbell to enter the camera sleep mode. The wireless communication and the signal may be sent via a server. Methods may include exiting the camera recording mode and entering the camera sleep mode in response to closing the doorbell control application on the remote computing device. Methods may include automatically overriding the power setting of the doorbell in response to opening the doorbell control application on the remote computing device.

In several embodiments, methods may include using a doorbell system. The doorbell system can comprise a remote computing device and a doorbell having a camera. Methods can comprise entering a camera sleep mode in which the camera is configured to not record; exiting the camera sleep mode and entering a camera recording mode in response to receiving, by the doorbell, a first wireless communication session from the remote computing device; and receiving, by the remote computing device, a first video recorded by the camera of the doorbell.

Some embodiments may include one or more of the following features. For example, methods can comprise exiting the camera recording mode and entering the camera sleep mode within a predetermined time from a termination of the first wireless communication session. Receiving the first video may be at least partially in response to the doorbell receiving the first wireless communication session from the remote computing device. The method may include starting the first wireless communication session and thereby causing the entering of the camera recording mode in response to opening a doorbell control application on the remote computing device prior to selecting a button of the doorbell control application to view the first video. Receiving the first video with the remote computing device may be in response to opening the doorbell control application prior to selecting the button to view the first video. Terminating the first wireless communication session may be in response to closing the doorbell control application on the remote computing device.

In several embodiments, methods comprise starting the first wireless communication session and thereby causing the entering of the camera recording mode in response to opening a doorbell control application on the remote computing device. Embodiments can include receiving the first video with the remote computing device in response to opening the doorbell control application and then erasing the first video from the remote computing device in response to closing the doorbell control application without selecting a first button of the doorbell control application to view the first video. Embodiments can include saving the first video on a data storage system that is located remotely relative to the doorbell and the remote computing device. Embodiments can include sending the first video from the data storage system to the remote computing device after erasing the first video from the remote computing device in response to selecting a second button of the doorbell control application; and then displaying the first video on the remote computing device. The data storage system may comprise a server. Methods can include associating a date with the first video on the server and displaying the date of the first video on the remote computing device (e.g., while the first video is displayed).

In several embodiments, methods can include using a doorbell system. The doorbell system can comprise a remote computing device and a doorbell having a doorbell camera. Methods can comprise opening a doorbell control application on the remote computing device; sending, automatically, a first signal from the remote computing device to the doorbell in response to opening the doorbell control application; and exiting, in response to the first signal, a camera sleep mode in which the doorbell camera is configured to not record, and entering a camera recording mode, wherein the camera recording mode consumes more power than the camera sleep mode.

Several embodiments include exiting the camera recording mode and entering the camera sleep mode, which can be in response to closing the doorbell control application on the remote computing device. Embodiments can include recording, by the doorbell, a first video in response to the first signal. The recording may be prior to a user selecting a button on the remote computing device. The button may be configured to cause the doorbell control application to display the first video. Embodiments can include receiving, with the remote computing device, the first video prior to selecting the button. Embodiments can include recording, by the doorbell, a first video in response to the first signal. In response to closing the doorbell control application on the remote computing device, the first video may be automatically erased from the remote computing device without displaying the first video on the remote computing device.

In several embodiments, a first video may be recorded by the doorbell in response to the first signal. The recording may be prior to a user selecting a button on the remote computing device. The button may be configured to cause the doorbell control application to display the first video. Methods may include receiving, with the remote computing device, the first video; and in response to not selecting the button, automatically erasing the first video from the remote computing device without displaying the first video on the remote computing device.

In several embodiments, methods may include using a doorbell system. Doorbell systems may comprise a remote computing device and a doorbell having a doorbell camera. Methods may include sending a first signal from the remote computing device to the doorbell in response to waking the remote computing device prior to opening a doorbell control application on the remote computing device; and exiting, in response to the first signal, a camera sleep mode in which the doorbell camera is configured to not record and entering a camera recording mode. The camera recording mode can consume more power than the camera sleep mode.

In some embodiments, methods comprise recording, by the doorbell camera, a first video in response to the first signal. Methods may include recording the first video with the doorbell camera and receiving the first video with the remote computing device prior to opening the doorbell control application. The first video may be displayed with the remote computing device while waiting for a live video from the doorbell. Methods may include recording, by the doorbell camera, a second video in response to the opening the doorbell control application; and displaying at least a portion of the first video on the remote computing device while waiting to receive the second video with the remote computing device. Methods may include displaying the second video with the remote computing device after the remote computing device receives the second video and before the remote computing device finishes displaying the first video such that the first video is configured to provide preliminary information while the doorbell system waits for updated information of the second video.

Several embodiments may include one or more of the following features. Methods can include recording, by the doorbell camera, a first video; recording, by the doorbell camera, a second video; sending the second video, rather than the first video, to the remote computing device in response to the second video being more recent than the first video; and displaying at least a portion of the second video on the remote computing device while waiting to receive an even more recent video with the remote computing device. The even more recent video may be a live video. Methods may further comprise ending the display of the portion of the second video and then displaying the live video in response to the live video being ready to display. The doorbell system may send the second video to the remote computing device in response to opening the doorbell control application. The doorbell system may send the even more recent video to the remote computing device in response to opening the doorbell control application.

In several embodiments, a doorbell system may send the second video to the remote computing device in response to opening the doorbell control application. The doorbell system may send the even more recent video to the remote computing device in response to a user selecting a button of the doorbell control application on the remote computing device.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

System Embodiments

Communication systems can provide a secure and convenient way for a remotely located individual to communicate with a person who is approaching a sensor, such as a proximity sensor or motion sensor, or with a person who rings a doorbell, which can be located in a doorway, near an entrance, or within 15 feet of a door. Some communication systems allow an individual to hear, see, and talk with visitors who approach at least a portion of the communication system and/or press a button, such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

Figure 1:
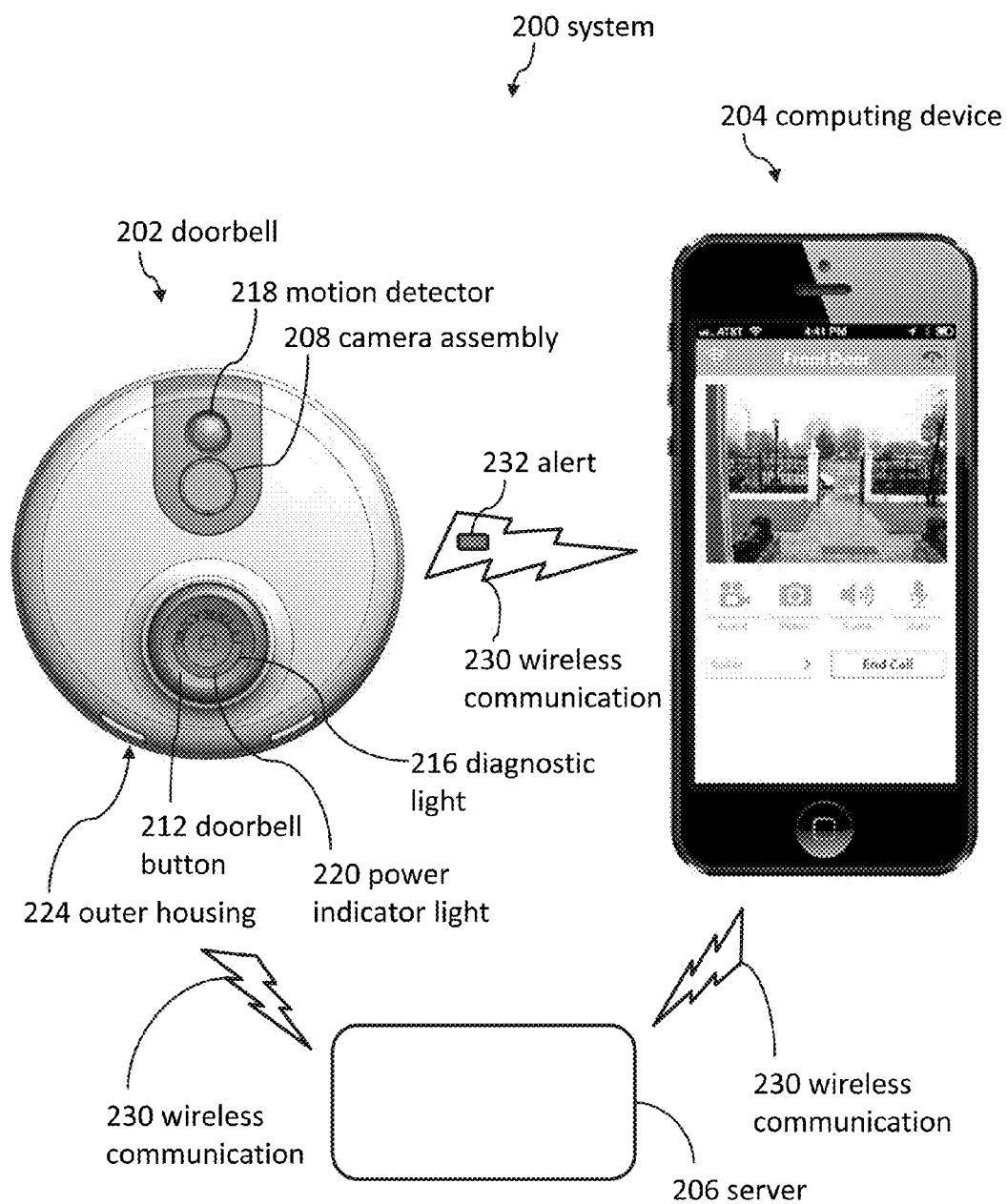
FIG. 1 illustrates a front view of a doorbell system, according to some embodiments.

Referring now to FIG. 1, the doorbell 202 can record video and audio, which can then be sent to a remote computing device 204. The remote computing device 204 displays the video and emits the audio from the doorbell 202 to enable a user of the remote computing device 204 to see and hear a visitor. For example, when the doorbell 202 detects a visitor (e.g., a motion sensor 218 detects a visitor or the visitor presses the button 212), the doorbell 202 can send a push notification to the remote computing device 204. A user of the remote computing device 204 can then see and hear the visitor.

The user of the remote computing device 204 can select a button on application software running on the remote computing device 204 to initiate two-way audio and/or video communication with the visitor. In some embodiments, the user can see and hear the visitor, and the visitor can hear (but not see the user). In several embodiments, the user can hear (but not see) the visitor. In some embodiments, the user and visitor can both see and hear each other (e.g., the doorbell 202 can include a display screen to show live video captured by a camera of the remote computing device 204).

Doorbell systems can be a portion of a smart home hub. In some embodiments, the doorbell system 200 forms the core of the smart home hub. For example, the various systems described herein enable complete home automation. In some embodiments, the doorbell 202 controls various electrical items in a home (e.g., lights, air conditioners, heaters, motion sensors, garage door openers, locks, televisions, computers, entertainment systems, pool monitors, elderly monitors). In some embodiments, the computing device 204 controls the doorbell 202 and other electrical items in a home (e.g., lights, air conditioners, heaters, motion sensors, garage door openers, locks, televisions, computers, entertainment systems, pool monitors, elderly monitors).

FIG. 1 illustrates a front view of a communication system embodiment. The doorbell system 200 can include a doorbell 202 (e.g., a security system) and a computing device 204. Although the illustrated doorbell 202 includes many components in one housing, several doorbell embodiments include components in separate housings. The doorbell 202 can include a camera assembly 208 and a doorbell button 212. The camera assembly 208 can include a video camera, which in some embodiments is a webcam. The doorbell 202 can include a diagnostic light 216 and a power indicator light 220. In some embodiments, the diagnostic light 216 is a first color (e.g., blue) if the doorbell 202 and/or the doorbell system 200 is connected to a wireless Internet network and is a second color (e.g., red) if the doorbell 202 and/or the doorbell system 200 is not connected to a wireless Internet network. In some embodiments, the power indicator 220 is a first color if the doorbell 202 is connected to a power source. The power source can be supplied by the building to which the doorbell 202 is attached. In some embodiments, the power indicator 220 is a second color or does not emit light if the doorbell 202 is not connected to the power source.

The doorbell 202 can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The doorbell 202 can be electrically coupled to a power source, such as wires electrically connected to a building's electrical power system. In some embodiments, the doorbell 202 includes a battery for backup and/or primary power.

Wireless communication 230 can enable the doorbell 202 to communicate with the computing device 204. Some embodiments enable communication via cellular and/or WiFi networks. Some embodiments enable communication via the Internet. Several embodiments enable wired communication between the doorbell 202 and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the doorbell 202 can initiate voice calls or send text messages to a computing device 204 (e.g., a smartphone, a desktop computer, a tablet computer, a laptop computer).

Several embodiments use near field communication (NFC) to communicate between the computing device 204 and the doorbell 202. The doorbell 202 and/or the computing device 204 can include a NFC tag. Some NFC technologies include Bluetooth, radio-frequency identification, and QR codes.

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
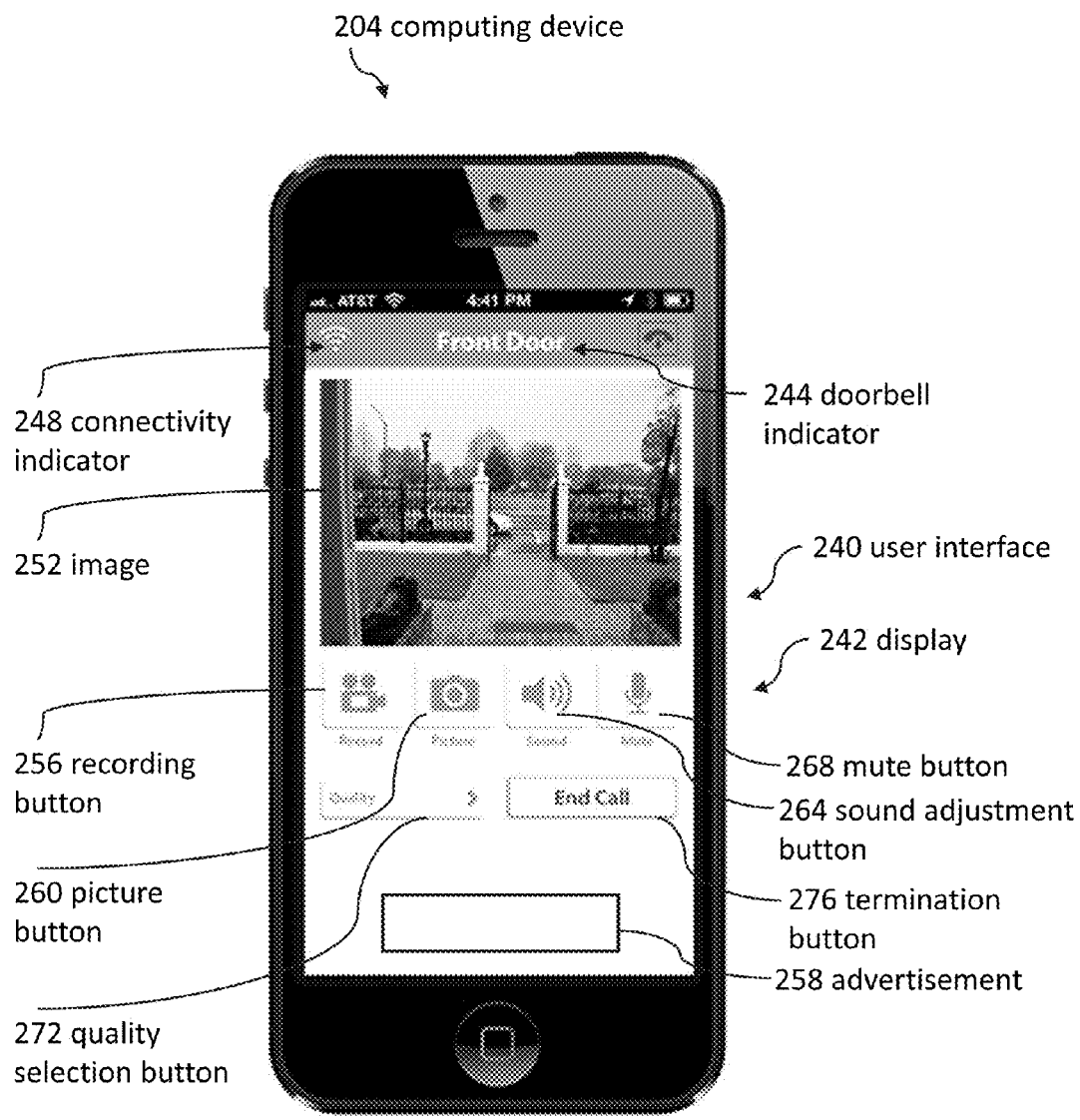
FIG. 2 illustrates a front view of a computing device running software to communicate with the doorbell from FIG. 1, according to some embodiments.

FIG. 2 illustrates a computing device 204 running software. The software includes a user interface 240 displayed on a display screen 242. The user interface 240 can include a doorbell indicator 244, which can indicate the location of the doorbell that the user interface is displaying. For example, a person can use one computing device 204 to control and/or interact with multiple doorbells, such as one doorbell located at a front door and another doorbell located at a back door. Selecting the doorbell indicator 244 can allow the user to choose another doorbell (e.g., a doorbell located by a back door rather than a doorbell located by a front door).

The user interface 240 can include a connectivity indicator 248. In some embodiments, the connectivity indicator 248 can indicate whether the computing device is in communication with a doorbell, the Internet, and/or a cellular network. The connectivity indicator 248 can alert the user if the computing device 204 has lost its connection with the doorbell 202; the doorbell 202 has been damaged; the doorbell 202 has been stolen; the doorbell 202 has been removed from its mounting location; the doorbell 202 has lost electrical power; and/or if the computing device 204 cannot communicate with the doorbell 202. In some embodiments, the connectivity indicator 248 alerts the user of the computing device 204 by flashing, emitting a sound, displaying a message, and/or displaying a symbol.

In some embodiments, if the doorbell 202 loses power, loses connectivity to the computing device 204, loses connectivity to the Internet, and/or loses connectivity to a remote server, a remote server 206 sends an alert 232 (e.g., phone call, text message, image on the user interface 240) regarding the power and/or connectivity issue. In several embodiments, the remote server 206 can manage communication between the doorbell 202 and the computing device 204. In some embodiments, information from the doorbell 202 is stored by the remote server 206. In several embodiments, information from the doorbell 202 is stored by the remote server 206 until the information can be sent to the computing device 204, uploaded to the computing device 204, and/or displayed to the remotely located person via the computing device 204. The remote server 206 can be a computing device that stores information from the doorbell 202 and/or from the computing device 204. In some embodiments, the remote server 206 is located in a data center.

In some embodiments, the computing device 204 and/or the remote server 206 attempts to communicate with the doorbell 202. If the computing device 204 and/or the remote server 206 is unable to communicate with the doorbell 202, the computing device 204 and/or the remote server 206 alerts the remotely located person via the software, phone, text, a displayed message, and/or a website. In some embodiments, the computing device 204 and/or the remote server 206 attempts to communicate with the doorbell 202 periodically; at least every five hours and/or less than every 10 minutes; at least every 24 hours and/or less than every 60 minutes; or at least every hour and/or less than every second.

In some embodiments, the server 206 can initiate communication with the computing device 204 and/or with the doorbell 202. In several embodiments, the server 206 can initiate, control, and/or block communication between the computing device 204 and the doorbell 202.

In several embodiments, a user can log in to an "app," website, and/or software on a computing device (e.g., mobile computing device, smartphone, tablet, desktop computer) to adjust the doorbell settings discussed herein.

In some embodiments, a computing device can enable a user to watch live video and/or hear live audio from a doorbell due to the user's request rather than due to actions of a visitor. Some embodiments include a computing device initiating a live video feed (or a video feed that is less than five minutes old).

In some embodiments, the user interface 240 displays an image 252 such as a still image or a video of an area near and/or in front of the doorbell 202. The image 252 can be taken by the camera assembly 208 and stored by the doorbell 202, server 206, and/or computing device 204. The user interface 240 can include a recording button 256 to enable a user to record images, videos, and/or sound from the camera assembly 208, microphone of the doorbell 202, and/or microphone of the computing device 204.

In several embodiments, the user interface 240 includes a picture button 260 to allow the user to take still pictures and/or videos of the area near and/or in front of the doorbell 202. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the doorbell 202 to enable the camera assembly 208 to provide sufficient visibility (even at night).

In some embodiments, buttons include diverse means of selecting various options, features, and functions. Buttons can be selected by mouse clicks, keyboard commands, and touching a touch screen. Many embodiments include buttons that can be selected without touch screens.

In some embodiments, the user interface 240 includes a quality selection button 272, which can allow a user to select the quality and/or amount of the data transmitted from the doorbell 202 to the computing device 204 and/or from the computing device 204 to the doorbell 202.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include a termination button 276 to end communication between the doorbell 202 and the computing device 204. In some embodiments, the termination button 276 ends the ability of the person located near the doorbell 202 (i.e., the visitor) to hear and/or see the user of the computing device 204, but does not end the ability of the user of the computing device 204 to hear and/or see the person located near the doorbell 202.

In some embodiments, a button 276 is both an answer button (to accept a communication request from a visitor) and a termination button (to end communication between the doorbell 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the doorbell and to stop emitting sounds recorded by the doorbell.

In some embodiments, the user interface 240 opens as soon as the doorbell detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a doorbell. The methods can include causing the user interface to display on a remote computing device 204 due to the detection of the visitor (e.g., with or without user interaction). The methods can include displaying video from the doorbell and/or audio from the doorbell before the user accepts two-way communication with the visitor. The methods can include displaying video from the doorbell and/or audio from the doorbell before the user accepts the visitor's communication request. The methods can include the computing device simultaneously asking the user if the user wants to accept (e.g., answer) the communication request and displaying audio and/or video of the visitor. For example, in some embodiments, the user can see and hear the visitor via the doorbell before opening a means of two-way communication with the visitor.

In some embodiments, the software includes means to start the video feed on demand. For example, a user of the computing device might wonder what is happening near the doorbell 202. The user can open the software application on the computing device 204 and instruct the application to show live video and/or audio from the security device 202 even if no event near the doorbell 202 has triggered the communication.

In several embodiments, the security device 202 can be configured to record when the security device 202 detects movement and/or the presence of a person. The user of the computing device 204 can later review all video and/or audio records from when the security device 202 detected movement and/or the presence of a person.

Referring now to FIG. 1, in some embodiments, the server 206 controls communication between the computing device 204 and the doorbell 202, which can be a doorbell with a camera, a microphone, and a speaker. In several embodiments, the server 206 does not control communication between the computing device 204 and the doorbell 202.

In some embodiments, data captured by the doorbell and/or the computing device 204 (such as videos, pictures, and audio) is stored by another remote device such as the server 206. Cloud storage, enterprise storage, and/or networked enterprise storage can be used to store video, pictures, and/or audio from the doorbell system 200 or from any part of the doorbell system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the doorbell 202 can store information and statistics regarding visitors and usage.

Figure 3:
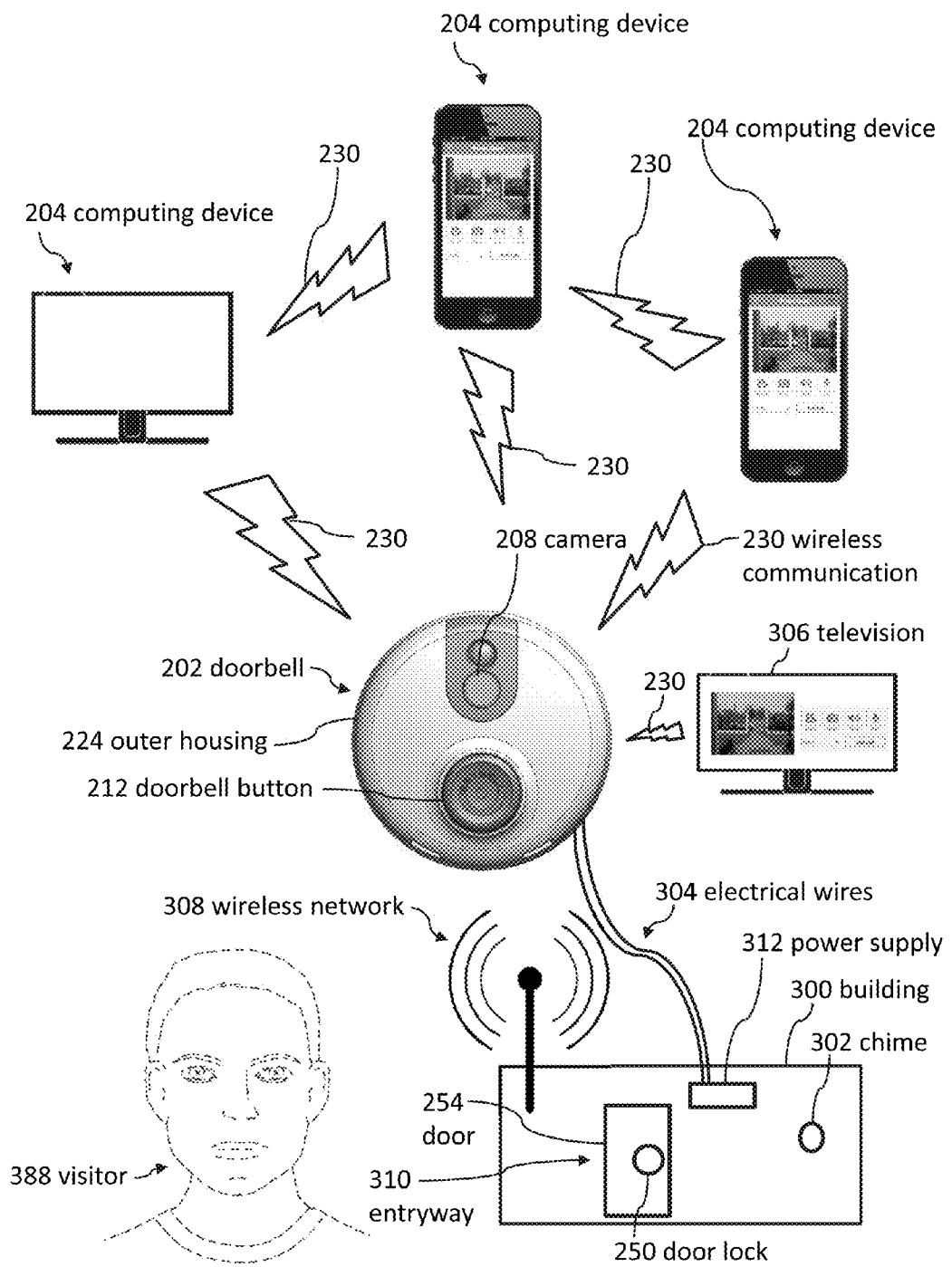
FIG. 3 illustrates a diagrammatic view of an embodiment in which the doorbell from FIG. 1 is connected to a building, according to some embodiments.

FIG. 3 illustrates an embodiment in which a doorbell 202 is connected to a building 300, which can include an entryway 310 that has a door 254. A visitor 388 can approach the doorbell 202 and then can be detected by the doorbell 202. The visitor 388 can press the doorbell button 212. The user of the doorbell 202 can configure the doorbell 202 such that when the visitor 388 presses the doorbell button 212, the user receives a notification regarding the visitor 388.

Electrical wires 304 can electrically couple the doorbell 202 to the electrical system 312 of the building 300 such that the doorbell 202 can receive electrical power from the building 300. The building can include a door lock 250 to lock the door 254.

A wireless network 308 can allow devices to wirelessly access the Internet. The doorbell 202 can access the Internet via the wireless network 308. The wireless network 308 can transmit data from the doorbell 202 to the Internet, which can transmit the data to remotely located computing devices 204. The Internet and wireless networks can transmit data from remotely located computing devices 204 to the doorbell 202. In some embodiments, a doorbell 202 connects to a home's WiFi.

As illustrated in FIG. 3, multiple computing devices 204 can communicate with one doorbell 202. In some embodiments, one computing device 204 (e.g., a laptop, a smartphone, a mobile computing device, a television) can communicate with multiple doorbells 202.

In some embodiments, the doorbell 202 can communicate (e.g., wirelessly 230) with a television 306, which can be a smart television. Users can view the television 306 to see a visitor and/or talk with the visitor.

Figure 4:
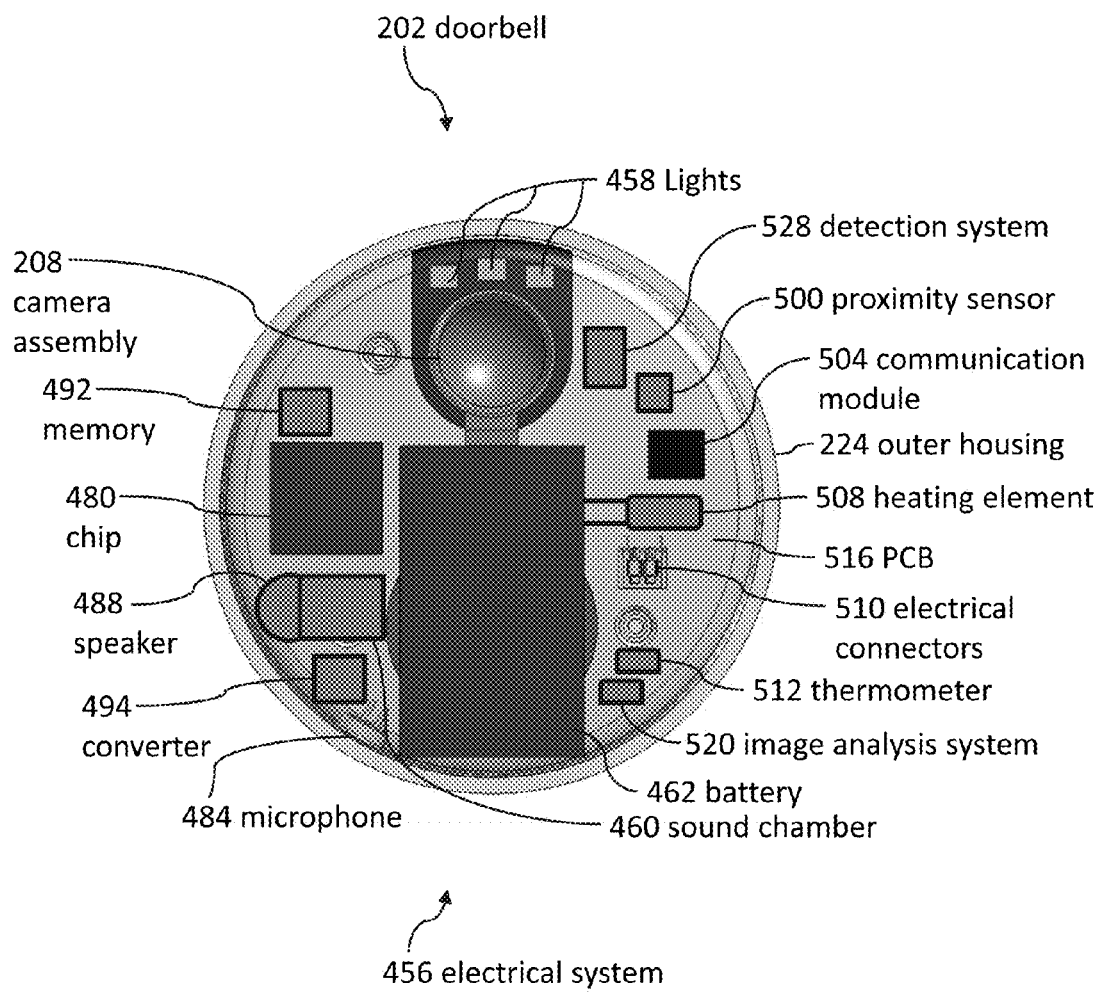
FIG. 4 illustrates a back view of the doorbell from FIG. 1 without a mounting bracket, according to some embodiments.

FIG. 4 illustrates an internal view of the doorbell 202. Doorbells 202 can include a chip 480 (e.g., integrated circuits, microprocessor, computer) and a memory 492. Doorbells 202 can also include a microphone 484 and a speaker 488. The speaker 488 can comprise a flat speaker and a sound chamber 460 configured to amplify an emitted sound. The flat speaker can be located in the sound chamber. Some doorbell embodiments include a proximity sensor 500. In several embodiments, doorbells 202 include a wireless communication module 504, such as a WiFi module. The communication module 504 can have an integrated antenna. In some embodiments, an antenna is contained within the outer housing 224.

The doorbell 202 can include one or more heating elements 508 configured to regulate the temperature of the doorbell 202. For example, doorbells 202 can be used in very cold environments, such as in Alaska. The heating element 508 can be used in various methods to protect temperature sensitive portions of the doorbell 202 from cold weather.

While protecting the doorbell 202 from cold weather can be important in some embodiments, protecting visitors from excessive heat can also be important in some embodiments. Excessive heat could burn visitors as they "ring" the doorbell (e.g., press the doorbell button 212 shown in FIG. 10). The doorbell 202 can include a thermometer 512 to enable the system to determine the temperature inside a portion of the doorbell 202 and/or outside the doorbell 202.

Several embodiments can be configured for 9 to 40 volts alternating current ("VAC") and/or 9 to 40 volts direct current ("VDC"). Some embodiments convert input electricity into direct current (DC), such as 12 VDC. Several embodiments include a converter 494 for power conversion (e.g., converting electrical energy from one form to another). The converter 494 can convert input power (e.g., from wiring in a building) to a suitable power form for the doorbell 202. The power conversion can convert between AC and DC, change the voltage, and/or change the frequency. The converter 494 can include a transformer and/or a voltage regulator. In several embodiments, the converter 494 can include a DC to DC converter, a voltage stabilizer, a linear regulator, a surge protector, a rectifier, a power supply unit, a switch, an inverter, and/or a voltage converter. In some embodiments, the converter 494 converts 50 Hertz ("Hz") power into 60 Hz power.

The electrical components of the doorbell 202 (e.g., the camera assembly 208, the memory 492, the chip 480, the speaker 488, the converter 494, the microphone 484, the lights 458, the rectifier, the proximity sensor 500, the communication module 504, the heating element 508, the electrical connectors 510, the thermometer 512, the image analysis system 520, and the battery 462) can be electrically coupled to a printed circuit board ("PCB") 516 and can receive electrical power from the PCB 516.

The PCB 516 and the electrical components of the doorbell 202 can be the electrical system 456 of the doorbell 202. Additional details regarding the PCB 516 and the electrical components of the doorbell 202 are described in U.S. Nonprovisional patent application Ser. No. 14/612,376; filed Feb. 3, 2015; and entitled DOORBELL COMMUNICATION SYSTEMS AND METHODS. The entire contents of patent application Ser. No. 14/612,376 are incorporated by reference herein.

In some embodiments, the user interface can include an area for displaying an advertisement 258.

The doorbell 202 can include a detection system 528. The doorbell 202 may be configured to alert the user to the presence of a visitor 388 by, for example, sounding a chime 302.

Although some embodiments are described in the context of methods, the method embodiments can also be formulated as devices and systems. Methods described herein can be applied to the devices and systems incorporated by references herein.

Video Embodiments

Communication systems can also provide a secure and convenient way for a remotely located individual to view an area near the doorbell 202 on demand. For example, communication systems can use a computing device to enable a remotely located person to see and/or hear the weather around the doorbell 202, check on the status of a package delivery, look for people prowling around, etc. Viewing by a remotely located person can occur via the Internet, cellular networks, telecommunication networks, servers, and wireless networks.

In some embodiments, a user may select a button in a software application (e.g., an app), which causes a live or previously recorded video to display on the remote computing device 204. The user can start the live video even if no visitor is present. For example, maybe the user wants to see if there is a package on the porch Leaving the camera on all the time just in case the user wants to see a video can waste substantial power. In order to reduce power consumption, the doorbell 202 may be able to enter a camera sleep mode 704. While the doorbell 202 is in the camera sleep mode 704, the camera may not be able to record a video, but the power consumption is very low, or maybe even zero. In some embodiments, the remote computing device 204 may send a signal 604 to the doorbell 202 that overrides the sleep mode (e.g., changes a power setting 702) to cause the doorbell 202 to "wake up." Waking up the doorbell 202 can cause the doorbell 202 to enter a higher-power mode that may enable the camera to record. This overriding can enable the video feed to start. The signal 604 can be sent when the user selects a button on the remote computing device 204 or when the user opens a software application. In some embodiments, a remote computing device can display a live video from the doorbell camera in response to a user opening a doorbell control application on the remote computing device.

Referring now to FIGS. 1 and 2, software can start the video feed on demand. For example, a user of the computing device 204 might wonder what is happening near the security system 202. The user can open the software application (e.g., an "app") on the computing device 204 and instruct the application to show live video and/or audio from the security device 202 even if no event near the security system 202 has triggered the communication.

Figure 5:
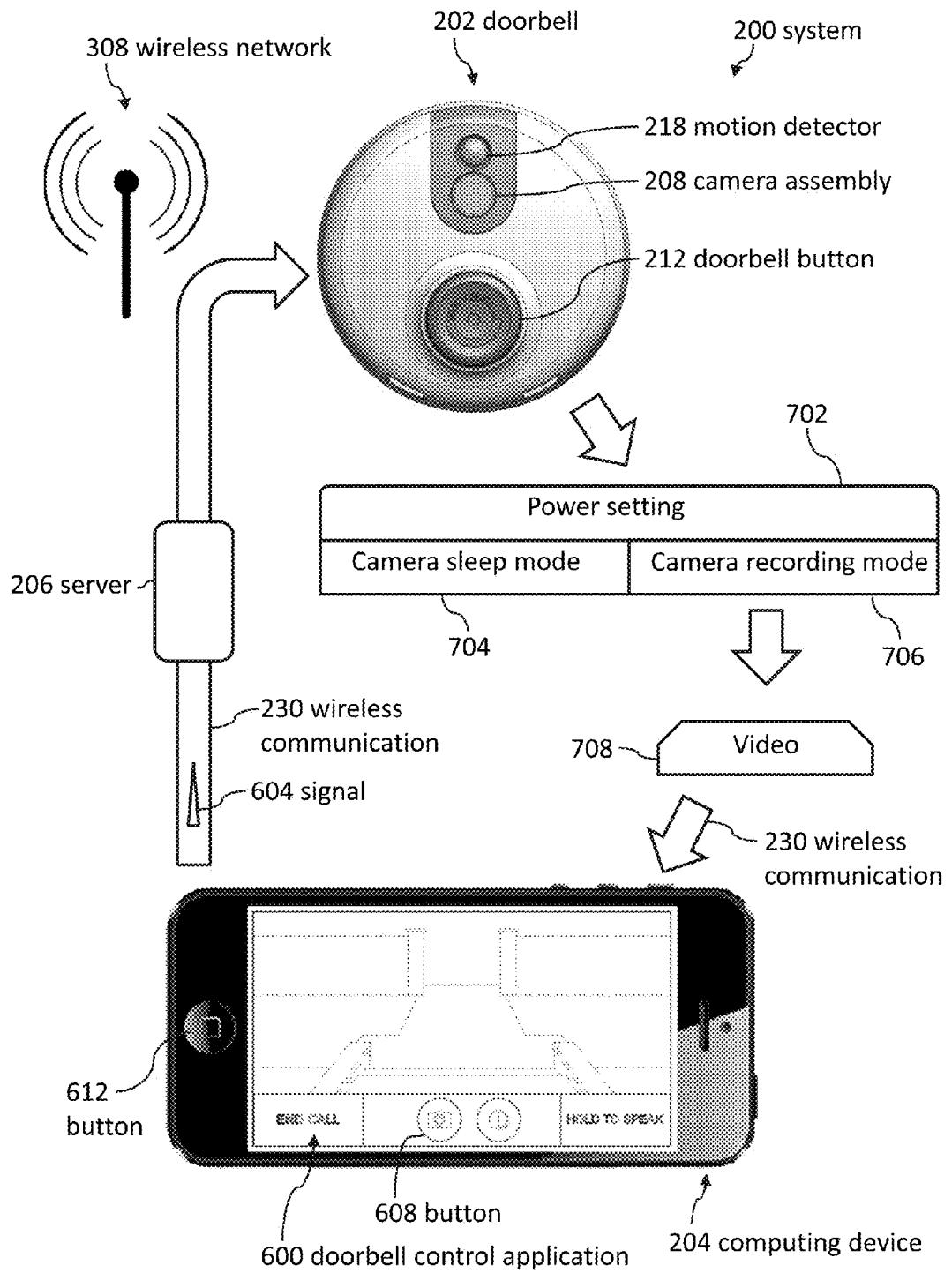
FIG. 5 illustrates a diagrammatic view of a doorbell and a doorbell control software application running on a computing device, according to some embodiments.

Several embodiments include "on-demand" service. For example, a user can initiate communicate via a doorbell 202 and/or can initiate live video from the doorbell 202 by pressing a button 260 on a user interface 240 (shown in FIG. 2). Pressing the on-demand button 260 again can terminate the communication and/or the live video. Referring now to FIG. 5, the doorbell 202 may have several power settings 702, e.g., camera sleep mode 704, camera recording mode 706, standby mode. Different power settings 702 may be configured to use different amounts of power, for example, the camera recording mode 706 may consume more power than the camera sleep mode 704. During the camera sleep mode 704 the camera can be configured to not record or to turn off completely which may allow the camera sleep mode 704 to use no power.

In some embodiments the doorbell system 200 may enter a camera sleep mode 704 wherein the camera is configured to not record. When the user 712 opens a doorbell control application 600 on the remote computing device 204, the power setting 702 of the doorbell system 200 may be overridden by the remote computing device 204 to force the doorbell system 200 to exit the camera sleep mode 704 and enter a camera recording mode 706 via a wireless communication 230. Overriding the power setting 702 of the doorbell system 200 may cause a first video 708 to be sent from the doorbell 202 to the remote computing device 204.

In some embodiments, the user can cause the remote computing device 204 to override a power setting 702 of the doorbell 202 to, for example, force the doorbell 202 to exit the camera sleep mode 704 and enter a camera recording mode 706. The user may cause the remote computing device 204 to override a power setting 702 of the doorbell 202 by opening a doorbell control application 600 on the remote computing device 204, closing the doorbell control application 600 on the remote computing device 204, or pressing a button 212 on the remote computing device 204. Thus the doorbell 202 may enter the camera recording mode 706 without detecting a visitor 388 and without detecting a press of a button 212 of the doorbell 202.

In some embodiments, the doorbell 202 may wake up from the camera sleep mode 704 and enter the camera recording mode 706 when the user selects a button 212 on the remote computing device 204. The doorbell 202 may enter a camera sleep mode 704 in response to a user again selecting a button 212 on the remote computing device 204 or in response to the user selecting another button on the remote computing device 204. In several embodiments, the power setting 702 of the doorbell 202 may be automatically overridden, i.e., without the user pressing a button on the remote computing device 204. The power setting 702 may be automatically overridden when the remote computing device 204 is turned on, causing the doorbell 202 to exit the camera sleep mode 704 and enter the camera recording mode 706. Likewise, the power setting 702 can be automatically overridden by the user closing the doorbell control application 600 on the remote computing device 204, causing the doorbell 202 to exit the camera recording mode 706 and enter the camera sleep mode 704. In some embodiments the doorbell 202 can be configured to exit the camera recording mode 706 and enter the camera sleep mode 704 within a predetermined time from a termination of the first wireless communication session. In some embodiments the doorbell 202 can be configured to exit the camera recording mode 706 and enter the camera sleep mode 704 in response to the remote computing device 204 being turned off or the remote computing device 204 losing its connection with the doorbell 202.

The remote computing device 204 may override the power setting 702 of the doorbell 202 via a wireless communication 230. After the power setting 702 has been overridden, a signal 604 can be sent, at least partially by the remote computing device 204, to the doorbell 202. The signal 604 can cause the power setting 702 of the doorbell 202 to change. The signal 604 can, for example, cause the doorbell 202 to enter the camera sleep mode 704. The wireless communication 230 and the signal 604 may be sent via a server 206.

At least partially in response to remotely overriding the power setting 702 of the doorbell 202, the remote computing device 204, may receive a first video 708 from the doorbell 202. The first video may be a live video or a pre-recorded video. Some embodiments can be configured to automatically display the first video 708 on the remote computing device 204 during the camera recording mode 706. In some embodiments the first video 708 can be displayed on the remote computing device 204 in response to the user pressing a button 612 on the remote computing device 204 or selecting a button 608 in the doorbell control application 600. In some embodiments the first video can be displayed when the user opens the doorbell control application 600. In several embodiments the first video can be displayed when the doorbell 202 enters the camera recording mode 706 without detecting a visitor 388 and without detecting a press of a button 212 of the doorbell 202.

Figure 6:
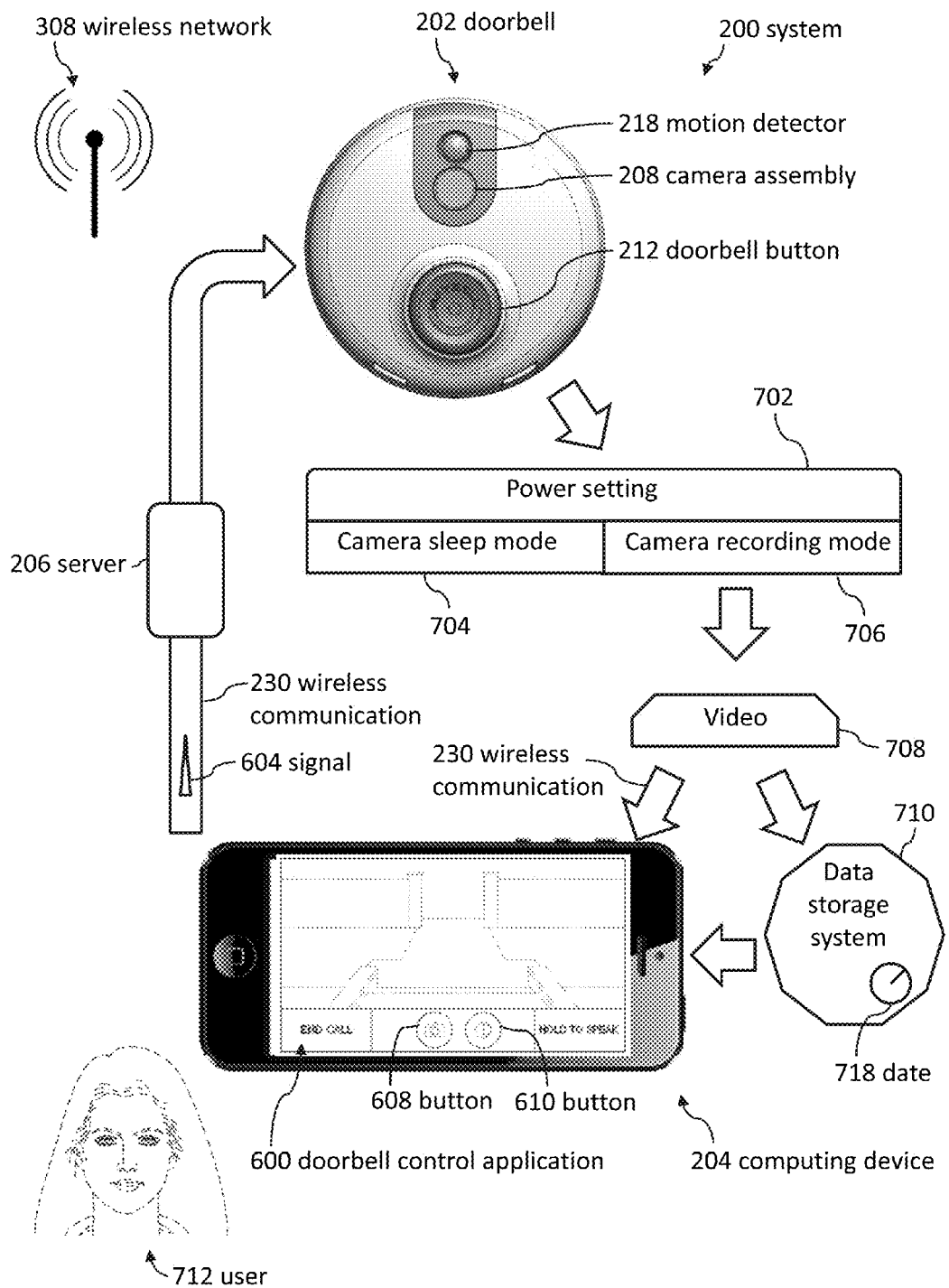
FIG. 6 illustrates a diagrammatic view of a doorbell, a doorbell control software application running on a computing device, and a data storage system, according to some embodiments.
Figure 7A:
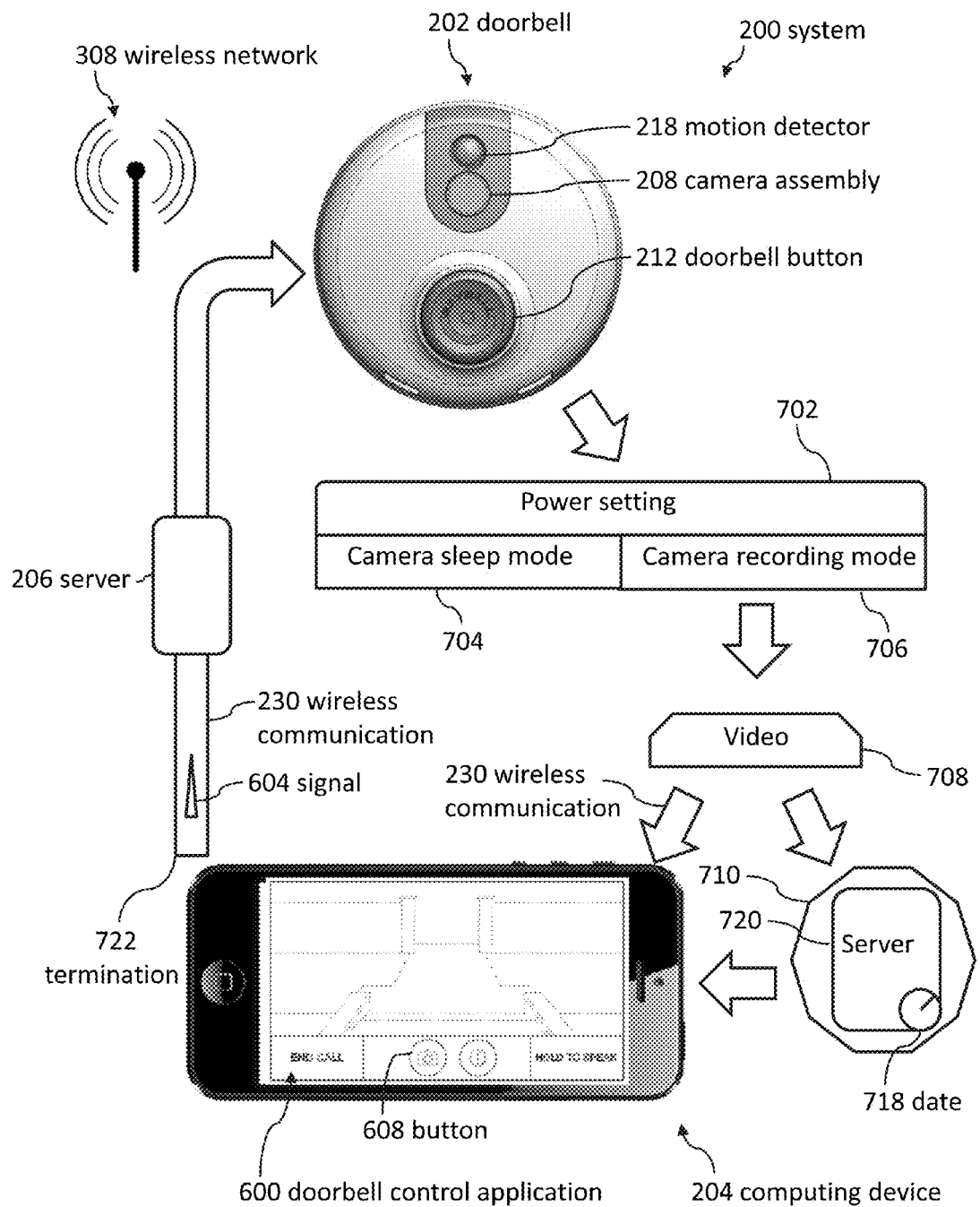
FIGS. 7a-7d illustrate a diagrammatic view of a doorbell, a doorbell control software application running on a computing device, and a data storage system server, according to some embodiments.
Figure 7B:
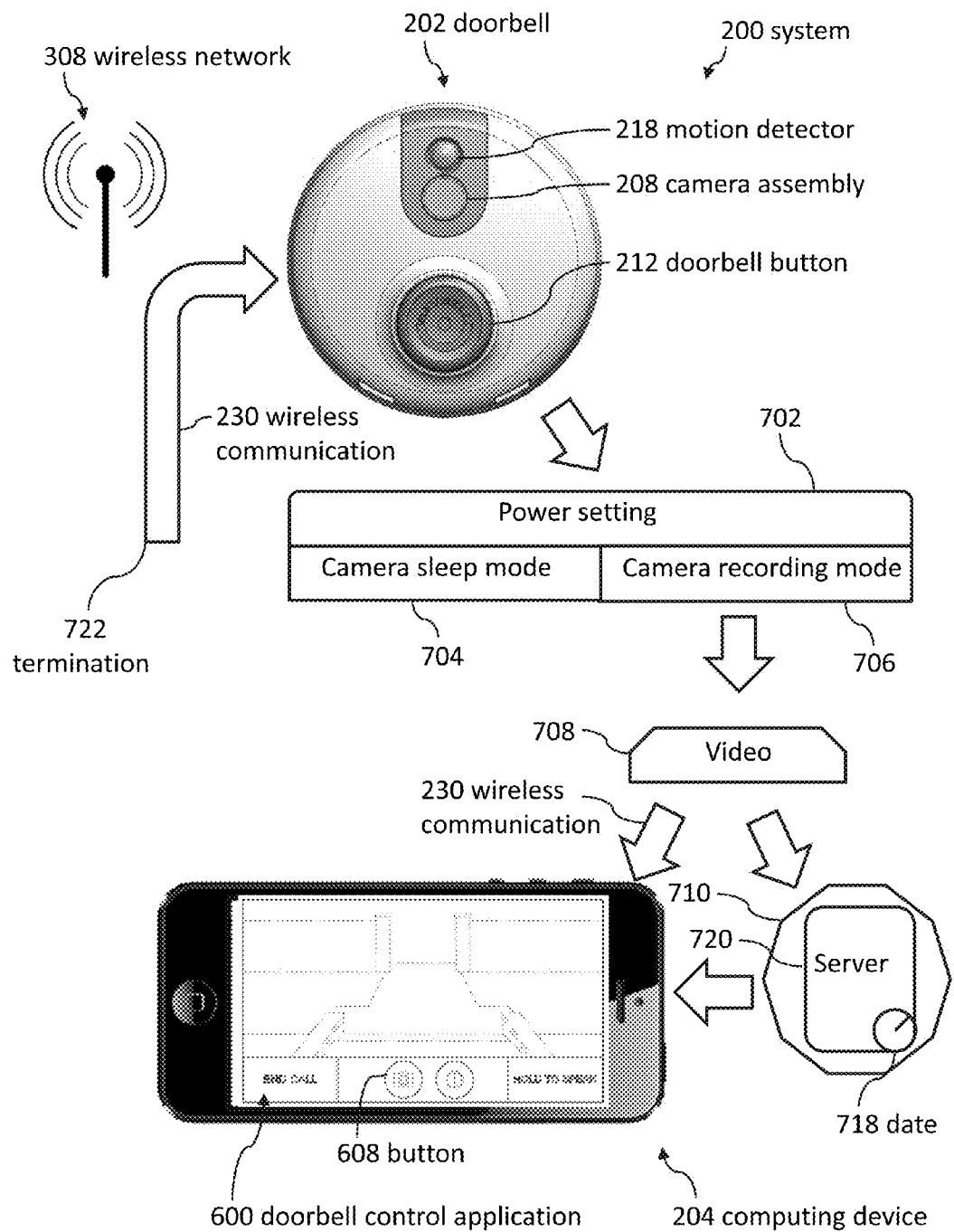
Figure 7C:
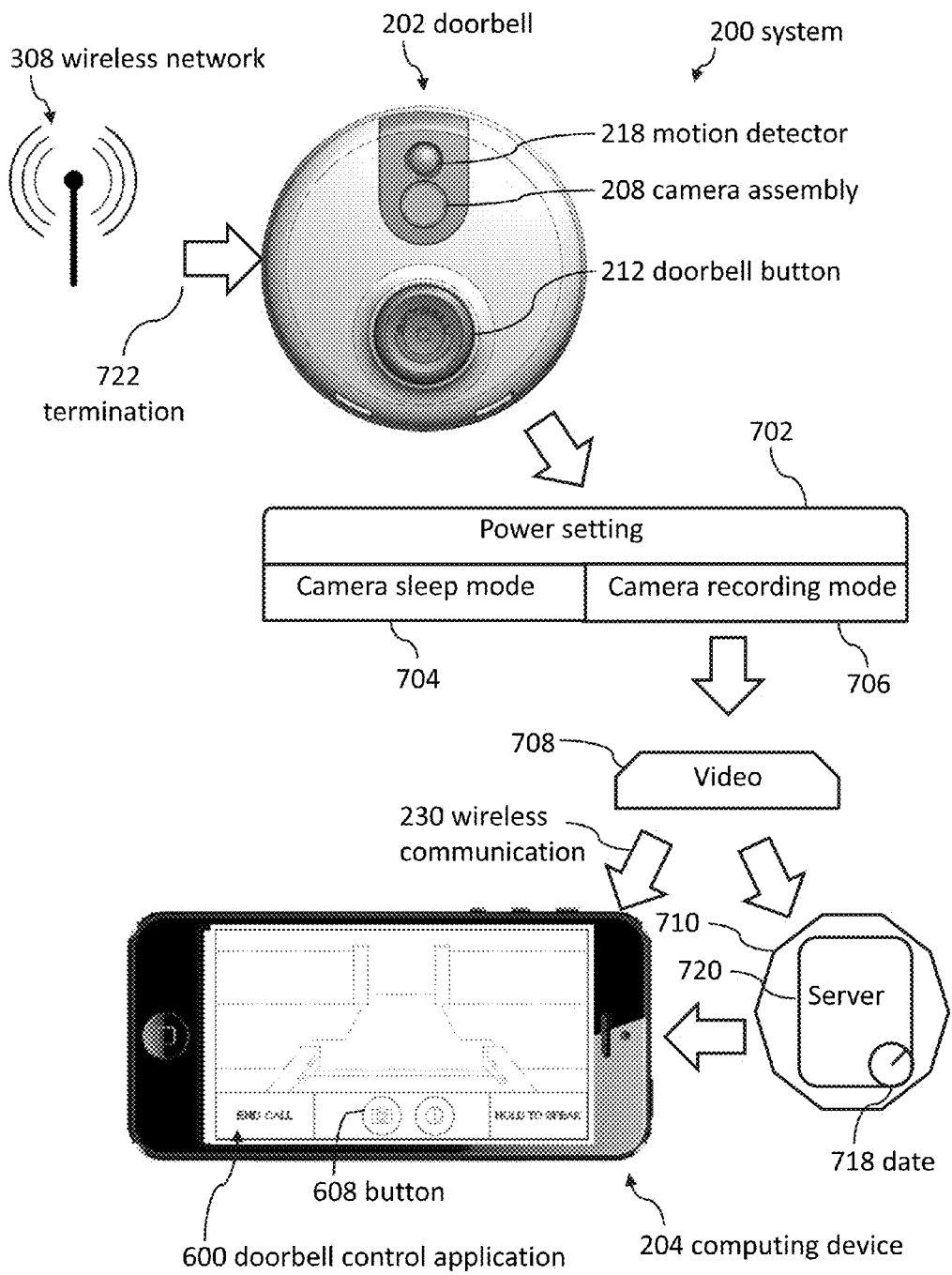
Figure 7D:
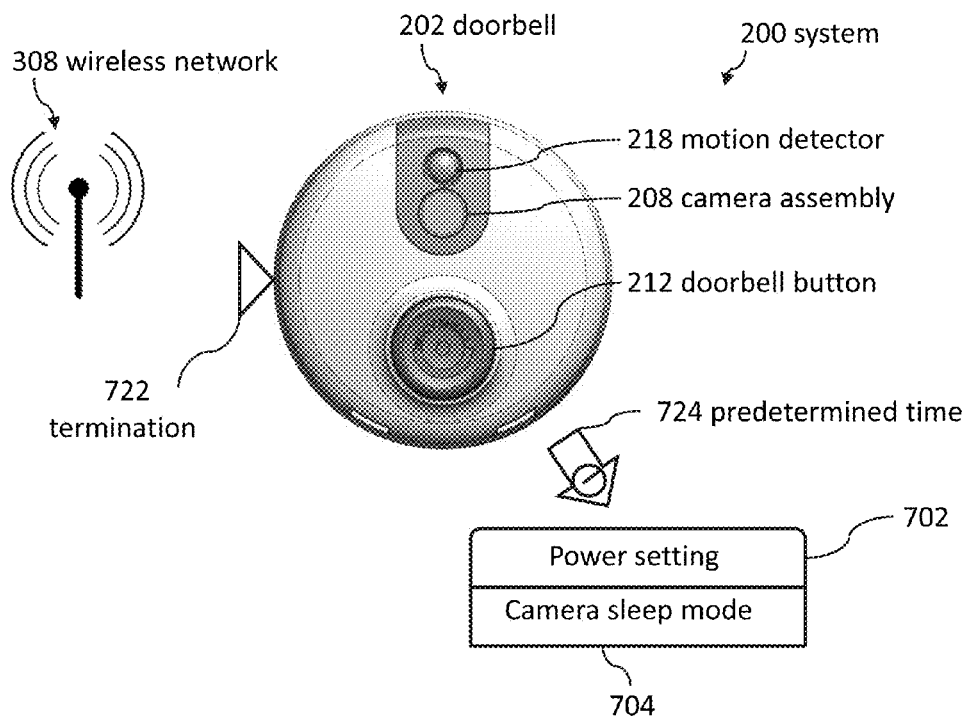
Figure 7D:
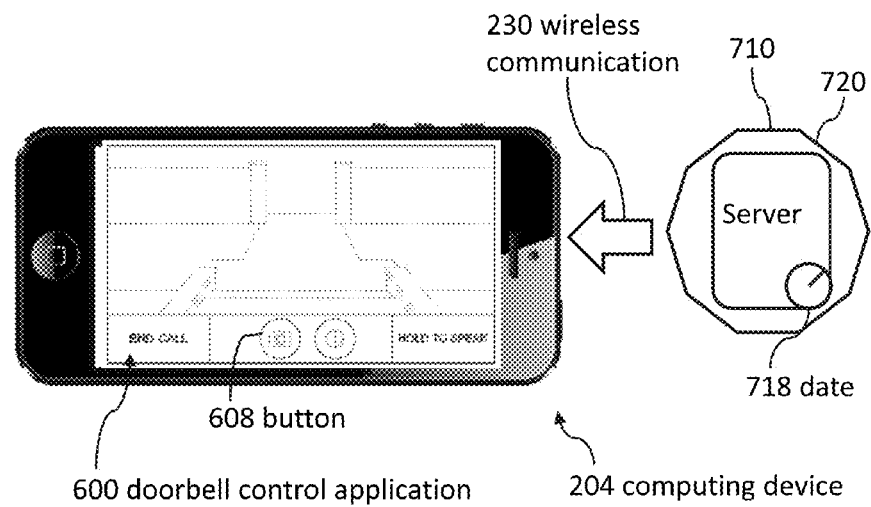

FIG. 6 illustrates an embodiment of a doorbell system 200. In some embodiments the doorbell system 200 may enter a camera sleep mode 704 wherein the camera is configured to not record. Upon receiving a wireless communication session 230 from the remote computing device 204 the doorbell system 200 can wake up, e.g. exit the camera sleep mode 704, and enter a camera recording mode 706. The remote computing device 204 may then receive a first video 708 recorded by the camera 208 of the doorbell 202.

The user 712 may start the first wireless communication by selecting a button 612 on the remote computing device 204 and/or a button 608 on the doorbell control application 600. In some embodiments the first wireless communication session may be started by the user 712 opening a doorbell control application 600 on the remote computing device 204 prior to selecting a button 608 of the doorbell control application 600 to view the first video 708. In some embodiments the first wireless communication session may be started automatically when the remote computing device 204 is turned on.

In some embodiments the remote computing device 204 may receive a first video 708, recorded by the camera of the doorbell 202. The first video may be a pre-recorded video or may be a live video. The remote computing device 204 may receive the first video 708, at least partially, in response to the doorbell 202 receiving the first wireless communication session from the remote computing device 204. The remote computing device 204 may receive the first video in response to the user 712 opening the doorbell control application 600 prior to the user 712 selecting the button 608. In some embodiments the remote computing device 204 receives the first video 708 in response to the user 712 selecting a button 612 on the remote computing device 204 or a button 608 on the doorbell control application 600. In some embodiments the remote computing device 204 may receive the first video 708 at predetermined times.

Saving videos on a remote computing device 204 can adversely affect how the remote computing device 204 runs and/or fill up the storage of the remote computing device 204. Videos may be erased from the remote computing device 204 to, for example, free up memory space. In some embodiments the first video 708 may be erased from the remote computing device 204 in response to closing the doorbell control application 600. The first video may be erased from the remote computing device 204 in response to the user 712 selecting a button on the remote computing device 204 or the doorbell control application 600. The first video may automatically, without instruction from the user 712, be erased after a predetermined time, when a second video is ready, or when the remote computing device 204 is turned off or enters a power saving mode. In several embodiments, the first video 708 may be saved on a data storage system 710 that is located remotely relative to the doorbell 202 and the remote computing device 204. Saving the first video on the remote data storage system 710 allows the first video to be stored for later viewing without interfering with the running of the remote computing device 204. When the user 712 instructs the remote computing device 204 to display the first video, the first video 708 can be sent from the data storage system 710 to the remote computing device 204 and displayed on the remote computing device 204 even after erasing the first video 708 from the remote computing device 204. The user 712 can instruct the remote computing device 204 to send the first video 708 by selecting a second button 610 of the doorbell control application 600. The data storage system 710 may comprise a server 720. A date 718 and/or a time may be associated with the first video 708 on the server 720 and the date 718 and/or time may be displayed when the first video 708 is displayed on the remote computing device 204.

Referring now to FIGS. 7a through 7d, in some embodiments the doorbell 202 can be configured to changed power settings 702 in response an elapsed time. For example, the doorbell 202 may be configured to exit the camera recording mode 706 and enter the camera sleep mode 704 within a predetermined time 724 from a termination 722 of the first wireless communication session. Terminating the first wireless communication session may be in response to closing the doorbell control application 600 on the remote computing device 204 or in response to turning off the remote computing device 204. In some embodiments the doorbell 202 can be configured to exit the camera recording mode 706 and enter the camera sleep mode 704 in response to the user 712 selecting a button on the remote computing device 204.

Figure 8:
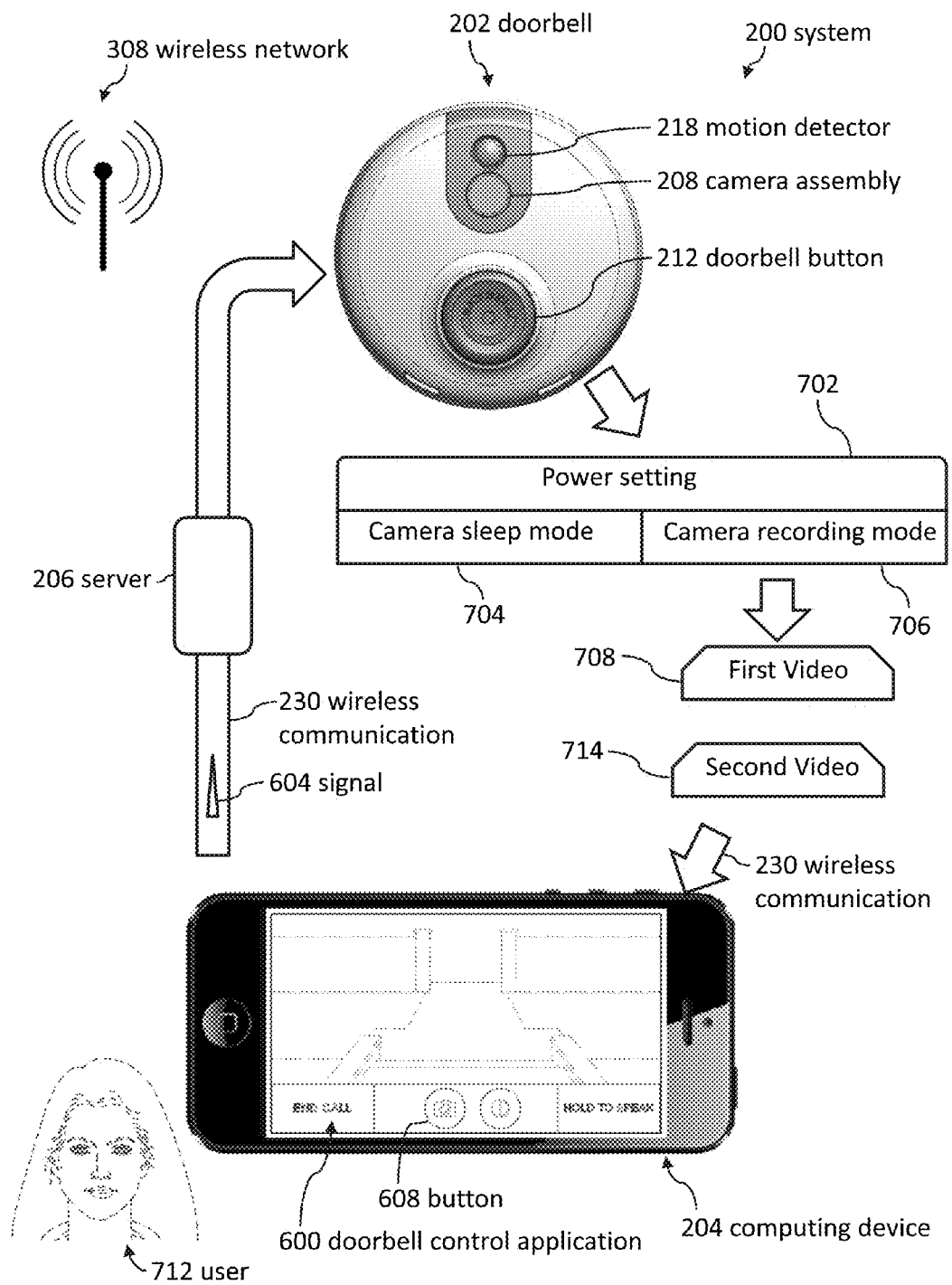
FIG. 8 illustrates a diagrammatic view of a doorbell and a doorbell control software application running on a computing device, according to some embodiments.
Figure 9:
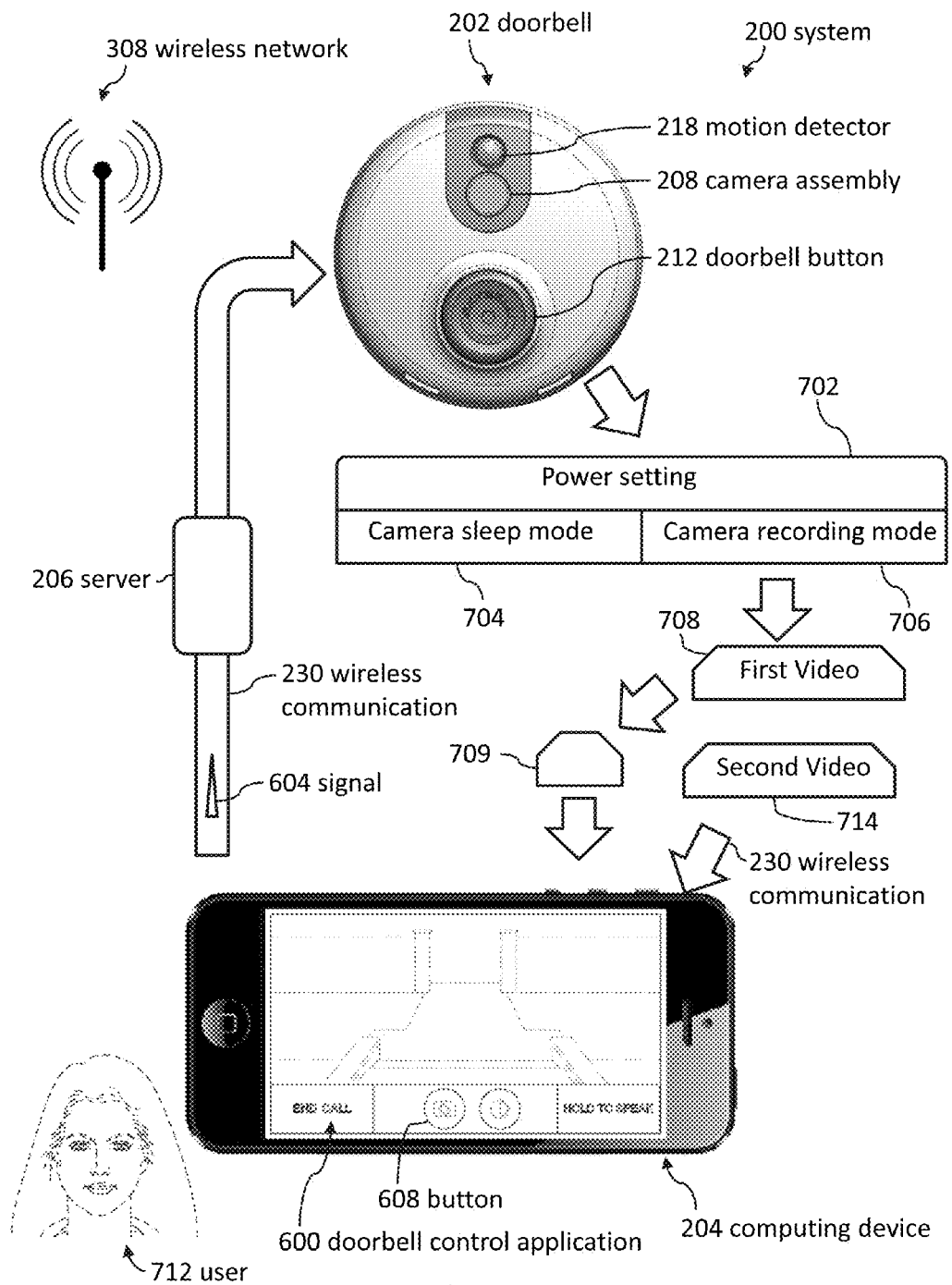
FIG. 9 illustrates a diagrammatic view of a doorbell and a doorbell control software application running on a computing device, according to some embodiments.

Referring now to FIG. 8, software can automatically cause the doorbell system 200 to change power settings 702. For example, the user 712 opening a doorbell control application 600 on the remote computing device 204 may cause the remote computing device 204 to automatically, i.e. without the user instructing, send a signal 604 from the remote computing device 204 to the doorbell 202. In response to the signal 604 the doorbell system 200 may exit a camera sleep mode 704 and enter a camera recording mode 706.

There may be a time delay between the user 712 instructing the remote computing device 204 to show a video and a live video being displayed on the remote computing device 204. The delay may be caused by the limitations of some Internet, cellular networks, telecommunication networks, or wireless networks. The delay may also be caused by the time it takes for the system to "wake up" and begin recording and transmitting the video. Even a delay of several seconds can seem like a long time for a user to wait after selecting a button to view an on-demand video.

In some embodiments the doorbell 202 can start the process to send live video in response to the user 712 opening the doorbell control application 600 or in response to the user 712 waking up and/or turning on the remote computing device 204. This may reduce the time delay between the user 712 instructing the app to display a live video, and the displaying of the video on a remote computing device 204.

A first signal 604 may be automatically (without instruction from the user 712) sent from the remote computing device 204 to the doorbell 202 in response to opening the doorbell control application 600 on the remote computing device 204. In response to the first signal 604, the doorbell may exit a camera sleep mode 704 in which the doorbell camera is configured to not record and enter a camera recording mode 706. The camera recording mode 706 may consume more power than the camera sleep mode 704. The camera sleep mode 704 may consume zero power.

In response to the first signal 604, a first video 708 may be recorded by the doorbell 202. The recording may be prior to a user 712 selecting a button 608 on the remote computing device 204. The remote computing device 204 may receive the first video 708 prior to the user 712 selecting the button.

The doorbell control application 600 may display the first video 708 on the remote computing device 204 in response to the remote computing device 204 receiving the first video 708. The user 712 selecting the button 608 may cause the doorbell control application 600 to display the first video 708.

The doorbell may exit the camera recording mode 706 and enter the camera sleep mode 704 in response to closing the doorbell control application 600 on the remote computing device 204. In response to closing the doorbell control application 600 on the remote computing device 204 and/or not selecting the button 608 the first video 708 may be automatically erased from the remote computing device 204 without displaying the first video 708 on the remote computing device 204. The first video 708 may be automatically erased from the remote computing device 204 without displaying the first video 708 on the remote computing device 204 after a predetermined time.

In several embodiments, a signal 604 can be sent from the remote computing device 204 to the doorbell 202 in response to waking the remote computing device 204 prior to opening a doorbell control application 600 on the remote computing device 204. The first signal 604 may cause the doorbell 202 to change power settings 702.

The first signal 604 may be sent in response to, for example, turning on the remote computing device 204. The doorbell may exit a camera sleep mode 704 in response to the first signal 604 and may enter a camera recording mode 706.

Some embodiments may include one or more of the following features. For example, the doorbell camera may record a first video 708 in response to the first signal 604. The remote computing device 204 may receive the first video 708 prior to opening the doorbell control application 600.

The doorbell camera may record a second video 714 in response to the opening the doorbell control application 600. At least a portion 709 of the first video 708 may be displayed on the remote computing device 204 while waiting to receive the second video 714 with the remote computing device 204.

The second video 714 may be displayed with the remote computing device 204 after the remote computing device 204 receives the second video 714 and before the remote computing device 204 finishes displaying the first video 708.

Figure 10:
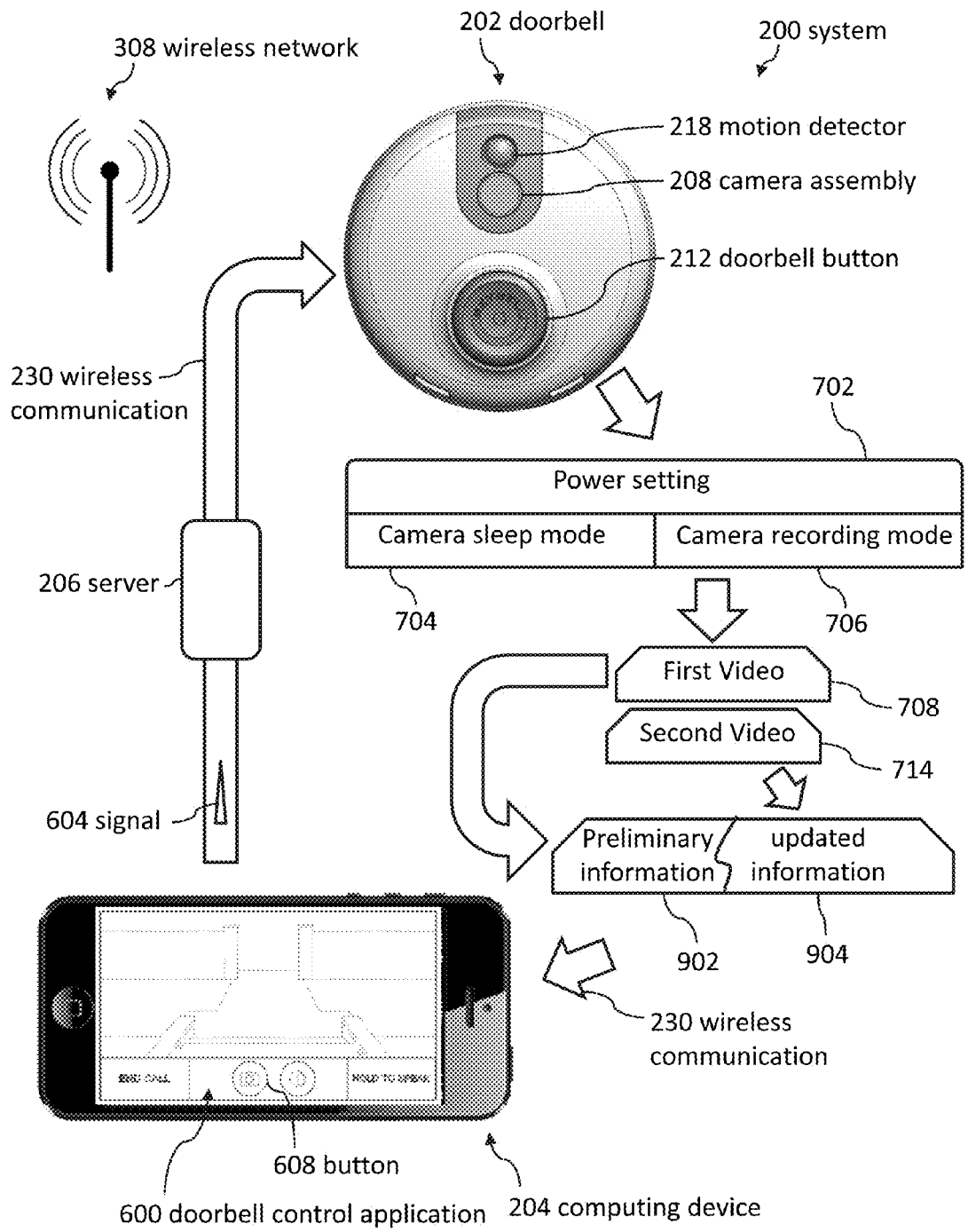
FIG. 10 illustrates a diagrammatic view of a doorbell and a doorbell control software application running on a computing device, according to some embodiments.

Referring now to FIG. 10, the first video 708 may be configured to provide preliminary information 902 while the doorbell system 200 waits for updated information 904 of the second video 714. At least a portion of the preliminary information 902 may be displayed on the remote computing device 204 while waiting for the updated information 904. Remote computing device 204 may be configured to display the first video 708 and second video 714 in such a way that they appear to be the same video, i.e. the user 712 may not notice the switch between the first video 708 and the second video 716.

In several embodiments the doorbell camera may record a first video 708 and a second video 714. The first video and the second video may be sent to the remote computing device 204. In some embodiments the second video 714, rather than the first video 708 may be sent to the remote computing device 204 in response to the second video 714 being more recent than the first video 708. The second video may be a live video. The doorbell system 200 may send the second video 714 to the remote computing device 204 in response to opening the doorbell control application 600.

Figure 11:
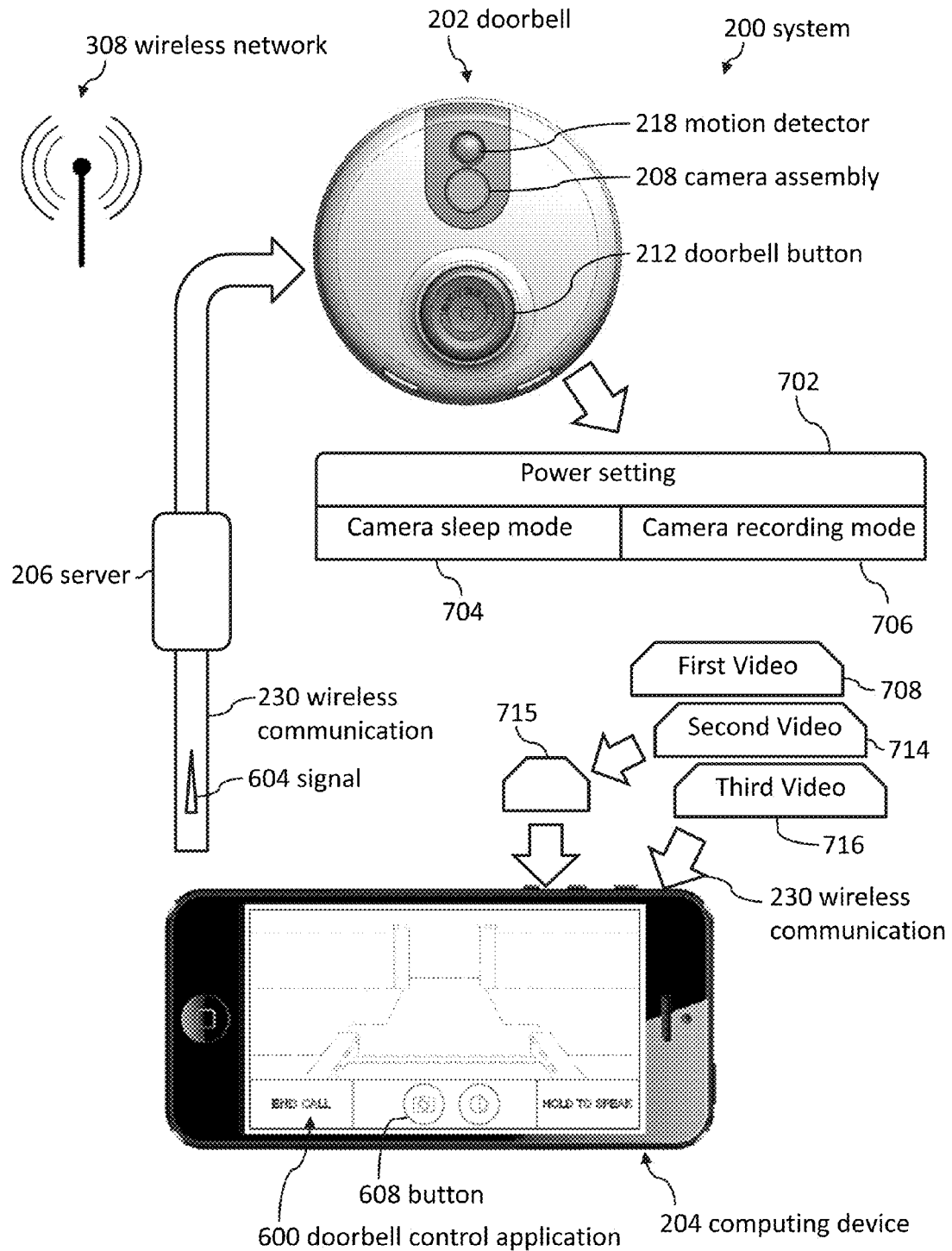
FIG. 11 illustrates a diagrammatic view of a doorbell and a doorbell control software application running on a computing device, according to some embodiments.

Referring now to FIG. 11, in some embodiments the doorbell camera may record a first video 708, a second video 714, and a third video 716. At least a portion 709 of the first video 708 may be displayed on the remote computing device 204 while waiting to receive the second video 714 or the third video 716 with the remote computing device 204. At least a portion 715 of the second video 714 may be displayed on the remote computing device 204 while waiting to receive a third, even more recent video 716 with the remote computing device 204. The third even more recent video 716 may be a live video 716. The display of the portion 715 of the second video 714 may be ended and the live video may be displayed in response to the live video being ready to display. The doorbell system 200 may send the second video 714 to the remote computing device 204 in response to opening the doorbell control application 600. The doorbell system 200 may send the even more recent video 716 to the remote computing device 204 in response to opening the doorbell control application 600. The doorbell system 200 may send the even more recent video 716 to the remote computing device 204 in response to a user 712 selecting a button 608 of the doorbell control application 600 on the remote computing device 204.

INTERPRETATION

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method of using a doorbell system, wherein the doorbell system comprises a remote computing device and a doorbell having a camera, the method comprising:
    coupling communicatively the doorbell and the remote computing device;
    detecting, by the doorbell system, an indication of a presence of a visitor;
    entering, by the doorbell, a camera sleep mode wherein the camera is configured to not record;
    opening a doorbell control application on the remote computing device;
    overriding, by the remote computing device via a wireless communication, a power setting of the doorbell to force the doorbell to exit the camera sleep mode and enter a camera recording mode, wherein the camera recording mode consumes more power than the camera sleep mode; and
    receiving a first video, by the remote computing device, from the doorbell at least partially in response to remotely overriding the power setting of the doorbell.

2. The method of claim 1, further comprising displaying the first video on the remote computing device during the camera recording mode, wherein the doorbell enters the camera recording mode without detecting a visitor and without detecting a press of a button of the doorbell.

3. The method of claim 1, wherein after the overriding, the method further comprises sending, at least partially by the remote computing device, a signal to the doorbell that causes the doorbell to enter the camera sleep mode.

4. The method of claim 3, wherein the wireless communication and the signal are sent via a server.

5. The method of claim 1, further comprising exiting the camera recording mode and entering the camera sleep mode in response to closing the doorbell control application on the remote computing device.

6. The method of claim 1, further comprising automatically overriding the power setting of the doorbell in response to opening the doorbell control application on the remote computing device.

7. A method of using a doorbell system, wherein the doorbell system comprises a remote computing device and a doorbell having a camera, the method comprising:
coupling communicatively the doorbell and the remote computing device;
detecting, by the doorbell system, an indication of a presence of a visitor;
entering, by the doorbell, a camera sleep mode in which the camera is configured to not record;
exiting, by the doorbell, the camera sleep mode and entering a camera recording mode in response to receiving, by the doorbell, a first wireless communication session from the remote computing device; and
receiving, by the remote computing device, a first video recorded by the camera of the doorbell.

8. The method of claim 7, further comprising exiting the camera recording mode and entering the camera sleep mode within a predetermined time from a termination of the first wireless communication session.

9. The method of claim 7, wherein receiving the first video is at least partially in response to the doorbell receiving the first wireless communication session from the remote computing device.

10. The method of claim 7, further comprising starting the first wireless communication session and thereby causing the entering the camera recording mode in response to opening a doorbell control application on the remote computing device prior to selecting a button of the doorbell control application to view the first video.

11. The method of claim 10, further comprising receiving the first video with the remote computing device in response to opening the doorbell control application prior to selecting the button to view the first video.

12. The method of claim 10, further comprising terminating the first wireless communication session in response to closing the doorbell control application on the remote computing device.

13. The method of claim 7, further comprising starting the first wireless communication session and thereby causing the entering the camera recording mode in response to opening a doorbell control application on the remote computing device;
receiving the first video with the remote computing device in response to opening the doorbell control application and then erasing the first video from the remote computing device in response to closing the doorbell control application without selecting a first button of the doorbell control application to view the first video;
saving the first video on a data storage system that is located remotely relative to the doorbell and the remote computing device;
sending the first video from the data storage system to the remote computing device after erasing the first video from the remote computing device in response to selecting a second button of the doorbell control application; and then
displaying the first video on the remote computing device.

14. The method of claim 13, wherein the data storage system comprises a server, and the method further comprises associating a date with the first video on the server and displaying the date of the first video on the remote computing device.

15. A method of using a doorbell system, wherein the doorbell system comprises a remote computing device and a doorbell having a doorbell camera, the method comprising:
coupling communicatively the doorbell and the remote computing device;
detecting, by the doorbell system, an indication of a presence of a visitor;
opening a doorbell control application on the remote computing device;
sending, automatically, a first signal from the remote computing device to the doorbell in response to opening the doorbell control application; and
exiting, by the doorbell, in response to the first signal, a camera sleep mode in which the doorbell camera is configured to not record and entering, by the doorbell, a camera recording mode, wherein the camera recording mode consumes more power than the camera sleep mode.

16. The method of claim 15, further comprising exiting the camera recording mode and entering the camera sleep mode in response to closing the doorbell control application on the remote computing device.

17. The method of claim 15, further comprising recording, by the doorbell, a first video in response to the first signal, wherein the recording is prior to a user selecting a button on the remote computing device, wherein the button is configured to cause the doorbell control application to display the first video; and receiving, with the remote computing device, the first video prior to selecting the button.

18. The method of claim 15, further comprising recording, by the doorbell, a first video in response to the first signal, and in response to closing the doorbell control application on the remote computing device, automatically erasing the first video from the remote computing device without displaying the first video on the remote computing device.

19. The method of claim 15, further comprising recording, by the doorbell, a first video in response to the first signal, wherein the recording is prior to a user selecting a button on the remote computing device, wherein the button is configured to cause the doorbell control application to display the first video; and receiving, with the remote computing device, the first video, wherein in response to not selecting the button, automatically erasing the first video from the remote computing device without displaying the first video on the remote computing device.

20. A method of using a doorbell system, wherein the doorbell system comprises a remote computing device and a doorbell having a doorbell camera, the method comprising:
sending a first signal from the remote computing device to the doorbell in response to waking the remote computing device prior to opening a doorbell control application on the remote computing device; and
exiting, by the doorbell, in response to the first signal, a camera sleep mode in which the doorbell camera is configured to not record and entering a camera recording mode, wherein the camera recording mode consumes more power than the camera sleep mode.

21. The method of claim 20, further comprising recording, by the doorbell camera, a first video in response to the first signal.

22. The method of claim 21, further comprising recording the first video with the doorbell camera and receiving the first video with the remote computing device prior to opening the doorbell control application.

23. The method of claim 22, further comprising displaying the first video with the remote computing device while waiting for a live video from the doorbell.

24. The method of claim 20, further comprising:
recording, by the doorbell camera, a first video in response to the first signal prior to opening the doorbell control application;
recording, by the doorbell camera, a second video in response to the opening the doorbell control application; and
displaying at least a portion of the first video on the remote computing device while waiting to receive the second video with the remote computing device.

25. The method of claim 24, further comprising displaying the second video with the remote computing device after the remote computing device receives the second video and before the remote computing device finishes displaying the first video such that the first video is configured to provide preliminary information while the doorbell system waits for updated information of the second video.

26. The method of claim 20, further comprising:
recording, by the doorbell camera, a first video;
recording, by the doorbell camera, a second video;
sending the second video, rather than the first video, to the remote computing device in response to the second video being more recent than the first video; and
displaying at least a portion of the second video on the remote computing device while waiting to receive an even more recent video with the remote computing device.

27. The method of claim 26, wherein the even more recent video is a live video, wherein the method further comprises ending the displaying of the portion of the second video and then displaying the live video in response to the live video being ready to display.

28. The method of claim 26, further comprising the doorbell system sending the second video to the remote computing device in response to opening the doorbell control application.

29. The method of claim 26, further comprising the doorbell system sending the even more recent video to the remote computing device in response to opening the doorbell control application.

30. The method of claim 26, further comprising the doorbell system sending the second video to the remote computing device in response to opening the doorbell control application, and the doorbell system sending the even more recent video to the remote computing device in response to a user selecting a button of the doorbell control application on the remote computing device.

\* \* \* \* \*